(12) United States Patent
Jeon et al.

(10) Patent No.: US 12,132,548 B2
(45) Date of Patent: Oct. 29, 2024

(54) DEVICE AND METHOD FOR ESTIMATING CHANNEL IN WIRELESS COMMUNICATION SYSTEM

(71) Applicant: Samsung Electronics Co., Ltd., Suwon-si (KR)

(72) Inventors: Younghyun Jeon, Suwon-si (KR); Eunyong Kim, Suwon-si (KR); Myoungwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/769,531

(22) PCT Filed: Oct. 15, 2020

(86) PCT No.: PCT/KR2020/014126
§ 371 (c)(1),
(2) Date: Apr. 15, 2022

(87) PCT Pub. No.: WO2021/075889
PCT Pub. Date: Apr. 22, 2021

(65) Prior Publication Data
US 2024/0187063 A1    Jun. 6, 2024

(30) Foreign Application Priority Data
Oct. 15, 2019    (KR) ........................ 10-2019-0128078

(51) Int. Cl.
*H04L 23/02* (2006.01)
*H04B 7/06* (2006.01)
*H04L 25/02* (2006.01)

(52) U.S. Cl.
CPC ......... *H04B 7/0626* (2013.01); *H04B 7/0639* (2013.01); *H04L 25/0222* (2013.01); *H04L 25/0228* (2013.01)

(58) Field of Classification Search
CPC .. H04B 17/373; H04B 17/318; H04B 7/0452; H04W 24/08; H04W 72/0446; H04L 25/0222; H04L 25/0228
(Continued)

(56) References Cited

U.S. PATENT DOCUMENTS

| 9,007,260 B2 | 4/2015 | Rachlin et al. |
| 10,567,066 B2 | 2/2020 | Jeon et al. |

(Continued)

FOREIGN PATENT DOCUMENTS

| CN | 101056302 A | 10/2007 |
| CN | 102724146 A | 10/2012 |

(Continued)

OTHER PUBLICATIONS

Xuanfan Shen et al., BEM-based UKF Channel Estimation for 5G-enabled V2V Channel, Nov. 26, 2018, IEEE, XP033520610.

(Continued)

*Primary Examiner* — Khai Tran
(74) *Attorney, Agent, or Firm* — Jefferson IP Law, LLP

(57) ABSTRACT

The present disclosure relates to a $5^{th}$ generation (5G) or pre-5G communication system for supporting a higher data transmission rate beyond a $4^{th}$ (4G) communication system such as long term evolution (LTE). According to a various embodiments of the present disclosure, a base station in a wireless communication system may comprise the steps of: acquiring, in a first time interval, channel information of a downlink channel with a terminal; on the basis of the unscented Kalman filter, acquiring current channel state information from previous state information and the channel information; and generating, from the current channel state information, predicted channel information in a second time interval.

14 Claims, 19 Drawing Sheets

(58) Field of Classification Search
USPC .................................. 275/262, 260, 267
See application file for complete search history.

(56) References Cited

U.S. PATENT DOCUMENTS

| | | |
|---|---|---|
| 2006/0013340 A1 | 1/2006 | Reid |
| 2007/0133696 A1 | 6/2007 | Iancu et al. |
| 2009/0052566 A1 | 2/2009 | Maltsev et al. |
| 2014/0310078 A1* | 10/2014 | Andriyanenko ... G06Q 30/0207 705/14.27 |
| 2016/0135180 A1* | 5/2016 | Yuan .................. H01Q 21/22 370/329 |
| 2018/0302213 A1 | 10/2018 | Bose et al. |
| 2019/0260459 A1 | 8/2019 | Jeon et al. |
| 2023/0353264 A1* | 11/2023 | Bai ..................... G06N 3/08 |

FOREIGN PATENT DOCUMENTS

| | | |
|---|---|---|
| KR | 10-2008-0101014 A | 11/2008 |
| KR | 10-1376400 B1 | 3/2014 |
| KR | 10-2017-0075794 A | 7/2017 |
| KR | 10-2018-0042773 A | 4/2018 |
| WO | 2018/074828 A1 | 4/2018 |

OTHER PUBLICATIONS

European Search Report dated Oct. 27, 2022, issued in European Application No. 20877336.6.
Korean Office Action dated Aug. 22, 2023, issued in a Korean Patent Patent Application No. 10-2019-0128078.
3GPP TS 38.211 V15.3.0, 3rd Generation Partnership Project; Technical Specification Group Radio Access Network; NR; Physical channels and modulation (Release 15), Sep. 2018.
3GPP TS 38.214 V15.3.0, 3rd Generation Partnership Project; Technical Specification Group Radio Access Network; NR; Physical layer procedures for data (Release 15), Sep. 2018.
Jussi Salmi et al., Detection and Tracking of MIMO Propagation Path Parameters Using State-Space Approach, IEEE Transactions on Signal Processing, vol. 57, No. 4, Apr. 2009.
Jianwei Zhao et al., Time Varying Channel Tracking with Spatial and Temporal BEM for Massive MIMO Systems, arXiv:1802.10461v1 [eess.SP] Feb. 27, 2018.
Stephen G. Larew et al., Adaptive Beam Tracking with the Unscented Kalman Filter for Millimeter Wave Communication, arXiv:1804.08640v1 [eess.SP] Apr. 23, 2018.
Korean Notice of Patent Grant dated Feb. 27, 2024, issued in Korean Patent Application No. 10-2019-0128078.
European Office Action dated Aug. 7, 2024, issued in European Application No. 20877336.6.
Indian Office Action dated Sep. 12, 2024, issued in Indian Application No. 202217027141.

* cited by examiner

DEVICE AND METHOD FOR ESTIMATING CHANNEL IN WIRELESS COMMUNICATION SYSTEM

TECHNICAL FIELD

The disclosure generally relates to a wireless communication system and, more particularly, to an apparatus and a method for estimating a channel in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultra-higher frequency (mmWave) bands (e.g., 60 GHz bands) so as to accomplish higher data rates. To decrease the propagation loss and increase the transmission distance of the radio waves in the ultra-higher frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, technical development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying and quadrature amplitude modulation (FQAM) and sliding window superposition coding (SWSC) as an advanced coding modulation (ACM) scheme, and filter bank multi carrier (FBMC), non-orthogonal multiple access (NOMA), and sparse code multiple access (SCMA) as an advanced access technology have also been developed.

DISCLOSURE OF INVENTION

Technical Problem

The disclosure provides an apparatus and a method for predicting a channel parameter in a wireless communication system on the basis of the discussion.

The disclosure provides an apparatus and a method for more accurately estimating a channel in a wireless communication system.

The disclosure provides an apparatus and a method for estimating a channel with low complexity in a wireless communication system.

Solution to Problem

According to various embodiments of the disclosure, a method performed by a base station in a wireless communication system includes: acquiring channel information for a downlink channel with a UE in a first time interval; acquiring current channel state information from previous state information and the channel information, based on an unscented Kalman filter (UKF); and generating predicted channel information in a second time interval from the current channel state information.

According to various embodiments of the disclosure, a base station in a wireless communication system includes: at least one transceiver; and at least one processor, wherein the at least one processor is configured to acquire channel information for a downlink channel with a UE in a first time interval, acquire current channel state information from previous state information and the channel information, based on an unscented Kalman filter (UKF), and generate predicted channel information in a second time interval from the current channel state information.

Advantageous Effects of Invention

An apparatus and a method according to various embodiments of the disclosure can more accurately estimate a channel with low complexity by predicting channel parameters on the basis of an unscented Kalman filter (UKF).

Advantageous effects obtainable from the disclosure may not be limited to the above-mentioned effects, and other effects which are not mentioned may be clearly understood, through the following descriptions, by those skilled in the art to which the disclosure pertains.

BEST MODE FOR CARRYING OUT THE INVENTION

Figure 1:
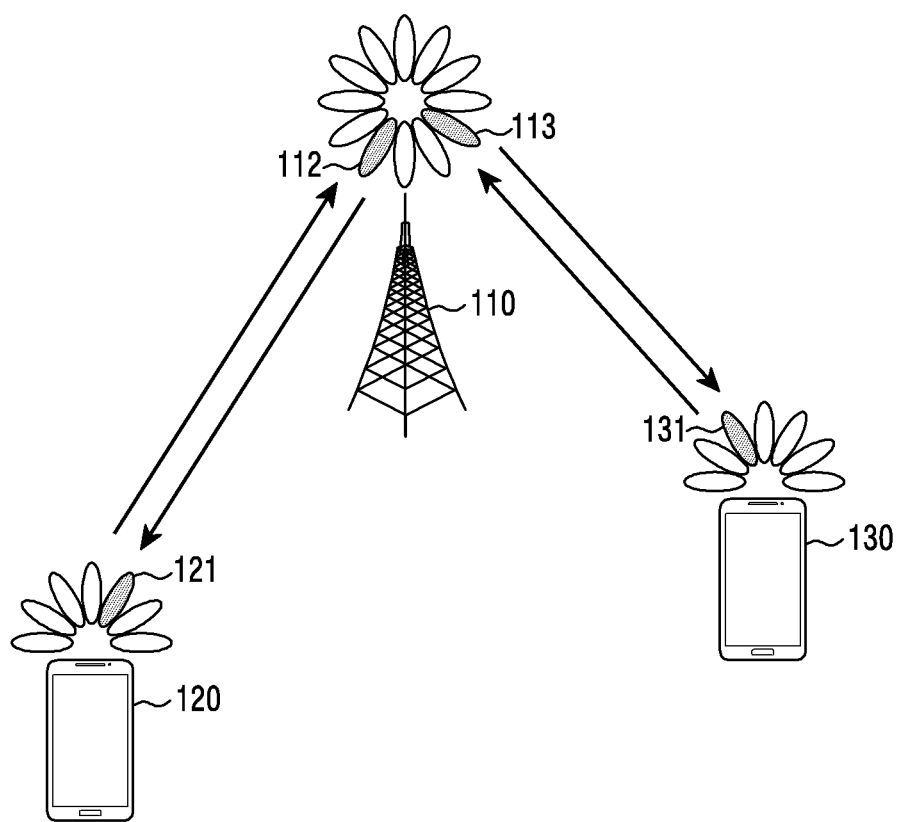
FIG. 1 illustrates a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for estimating a channel in a wireless communication system. Specifically, the disclosure relates to an apparatus and a method for estimating a channel on the basis of an unscented Kalman filter (UKF) which is one type of recursive filters. Further, the disclosure discloses an apparatus and a method for adaptively determining a channel estimation method by using the UKF in the state in which the UKF is needed and using other filters (for example, an extended Kalman filter (EKF)).

The term referring to a signal (for example, message, information, preamble, signal, signaling, sequence, or stream), the term referring to resources (for example, symbol, slot, subframe, radio frame, subcarrier, resource element (RE), resource block (RB), bandwidth part (BWP), or occasion), the term for a calculation state (for example, step, operation, or procedure), the term referring to data (for example, information, bit, symbol or codeword), the term referring to a channel, the term referring to control information (for example, downlink control information (DCI), medium access control control element (MAC CE), or radio resource control (RRC) signaling), the term referring to network entities, and the term referring to an element of a device, used in the following description are only examples for convenience of description. Accordingly, the disclosure is not limited to those terms, and other terms having the same technical meanings may be used.

In the following description, the terms "physical channel" and "signal" may be interchangeably used with "data" or "control signal". For example, "physical downlink shared channel (PDSCH)" is a term referring to a physical channel for transmitting data, but may be used to refer to data. That is, in the disclosure, the expression "transmit a physical channel" may be interpreted to be the same as the expression "transmit data or a signal through a physical channel".

In the disclosure, "higher-layer signaling" refers to a method of transmitting a signal from a base station (BS) to a UE through a downlink data channel of a physical layer or from a UE to a BS through an uplink data channel of a physical layer. Higher-layer signaling may be understood as radio resource control (RRC) signaling or a media access control (MAC) control element (CE).

Further, in the disclosure, the expressions "larger than" or "smaller than" may be used to indicate whether a specific condition is satisfied or fulfilled, but are used only to indicate examples, and do not exclude "larger than or equal to" or "equal to or smaller than". A condition indicating "larger than or equal to" may be replaced with "larger than", a condition indicating "equal to or smaller than" may be replaced with "smaller than", and a condition indicating "larger than or equal to and smaller than" may be replaced with "larger than and smaller than or equal to".

Further, the disclosure describes various embodiments using the terms used in some communication standards (for example, 3rd-generation partnership project (3GPP)), but this is only an example. Various embodiments may be easily modified and applied to other communication systems.

FIG. 1 illustrates a wireless communication system according to various embodiments of the disclosure. FIG. 1 illustrates a BS 110, a UE 120, and a UE 130 as some of nodes using a radio channel in a wireless communication system. Although FIG. 1 illustrates only one BS, another BS that is the same as or similar to the BS 110 may be further included.

The BS 110 is a network infrastructure element that provides radio access to the UEs 120 and 130. The BS 110 has coverage defined in a predetermined geographical area on the basis of the range within which a signal can be transmitted and received. The BS 110 may be referred to as an "access point (AP)", an "eNodeB (eNB)", a "5$^{th}$-generation (5G) node", a "g NodeB (next generation node B (gNB))", a "wireless point", or a "transmission/reception point (TRP)", or using another term having a technical meaning equivalent thereto, as well as "base station".

Each of the UE 120 and the UE 130 is a device used by a user and communicates with the BS 110 through a radio channel. A link from the BS 110 to the UE 120 or the UE 130 is referred to as a downlink (DL), and a link from the UE 120 or the UE 130 to the BS 110 is referred to as an uplink (UL). Although not illustrated in FIG. 1, the UE 120 and the UE 130 may communicate with each other through a radio channel according to an embodiment. At this time, a link between the UE 120 and the UE 130 (device-to-device link (D2D)) is referred to as a sidelink, and the sidelink may be interchangeably used with a PC 5 interface. Depending on circumstances, at least one of the UE 120 and the UE 130 may be operated without any involvement by the user. That is, at least one of the UEs 120 and 130 may be a device that performs machine-type communication (MTC), and may not be carried by the user. Each of the UE 120 and the UE 130 may be referred to as a "user equipment (UE)", "mobile station", "subscriber station", "remote terminal", "wireless terminal", or "user device", or using another term having an equivalent technical meaning, as well as "terminal".

The BS 110, the UE 120, and the UE 130 may transmit and receive a wireless signal in millimeter-wave (mmWave) bands (for example, 28 GHz, 30 GHz, 38 GHz, and 60 GHz). At this time, in order to increase a channel gain, the BS 110, the UE 120, and the UE 130 may perform beamforming. The beamforming may include transmission beamforming and reception beamforming. That is, the BS 110, the UE 120, and the UE 130 may assign directivity to a transmission signal or a reception signal. To this end, the BS 110 and the UEs 120 and 130 may select serving beams 112, 113, 121, and 131 through a beam search procedure or beam management procedure. After the serving beams 112, 113, 121, and 131 are selected, communication may be performed through resources having a quasi-co-located (QCL) relationship with resources through which the serving beams 112, 113, 121, and 131 are transmitted.

If the large-scale characteristics of a channel for transmitting symbols through a first antenna port can be inferred from a channel for transmitting symbols through a second antenna port, the first antenna port and the second antenna port may be evaluated to have a QCL relationship therebetween. For example, the large-scale characteristics may include at least one of delay spread, Doppler spread, Doppler shift, average gain, average delay, and spatial receiver parameters.

Figure 2:
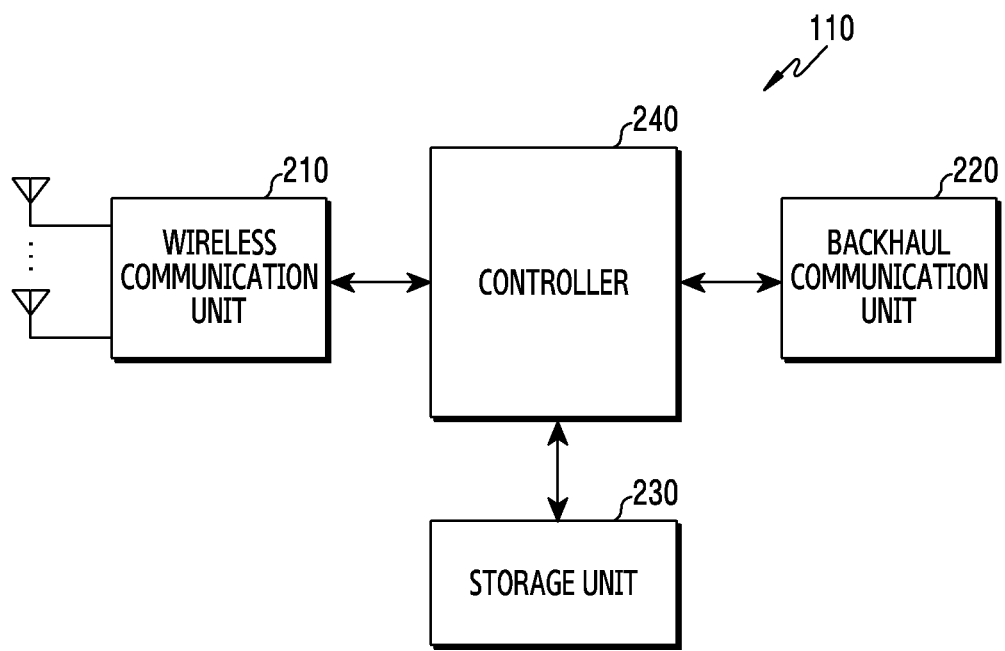
FIG. 2 illustrates the configuration of a BS in a wireless communication system according to various embodiments of the disclosure.

FIG. 2 illustrates the configuration of a BS in a wireless communication system according to various embodiments of the disclosure. The configuration illustrated in FIG. 2 may be understood to be the configuration of the BS 110. The suffix "-unit" or "-er" used hereinafter may refer to a unit for processing at least one function or operation, and may be implemented as hardware, software, or a combination of hardware and software.

Referring to FIG. 2, the BS includes a wireless communication unit 210, a backhaul communication unit 220, a storage unit 230, and a controller 240.

The wireless communication unit 210 performs functions for transmitting and receiving a signal through a radio channel. For example, the wireless communication unit 210 performs a function of conversion between a baseband signal and a bitstream according to the physical-layer standard of the system. For example, in data transmission, the wireless communication unit 210 generates complex symbols by encoding and modulating a transmission bitstream. In data reception, the wireless communication unit 210 reconstructs a reception bitstream by demodulating and decoding a baseband signal.

The wireless communication unit 210 up-converts a baseband signal into a radio-frequency (RF) band signal, transmits the RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. Further, the wireless communication unit 210 may include a plurality of transmission/reception paths. In addition, the wireless communication unit 210 may include at least one antenna array including a plurality of antenna elements.

On the hardware side, the wireless communication unit 210 may include a digital unit and an analog unit, and the analog unit may include a plurality of sub-units according to operating power, operating frequency, and the like. The digital unit may be implemented as at least one processor (for example, digital signal processor (DSP)).

The wireless communication unit 210 transmits and receives a signal as described above. Accordingly, all or part of the wireless communication unit 210 may be referred to as a "transmitter", a "receiver", or a "transceiver". Further, in the following description, transmission and reception performed through a radio channel may include the above-described processing by the wireless communication unit 210.

The backhaul communication unit 220 provides an interface for communicating with other nodes within the network. That is, the backhaul communication unit 220 converts a bitstream transmitted from the BS to another node, for example, another access node, another BS, a higher node, or a core network, into a physical signal, and converts a physical signal received from another node into a bitstream.

The storage unit 230 may store data such as a basic program for the operation of the BS, an application, and configuration information. The storage unit 230 may include volatile memory, nonvolatile memory, or a combination of volatile memory and nonvolatile memory. The storage unit 230 provides stored data in response to a request from the controller 240.

The controller 240 may control the overall operation of the BS. For example, the controller 240 transmits and receives a signal through the wireless communication unit 210 or the backhaul communication unit 220. The controller 240 records data in the storage unit 230 and reads the same. The controller 240 may perform the functions of a protocol stack required according to communication standards. According to another implementation, the protocol stack may be included in the wireless communication unit 210. To this end, the controller 240 may include at least one processor. According to various embodiments, the controller 240 may control the BS to perform operations according to various embodiments described below.

Figure 3:
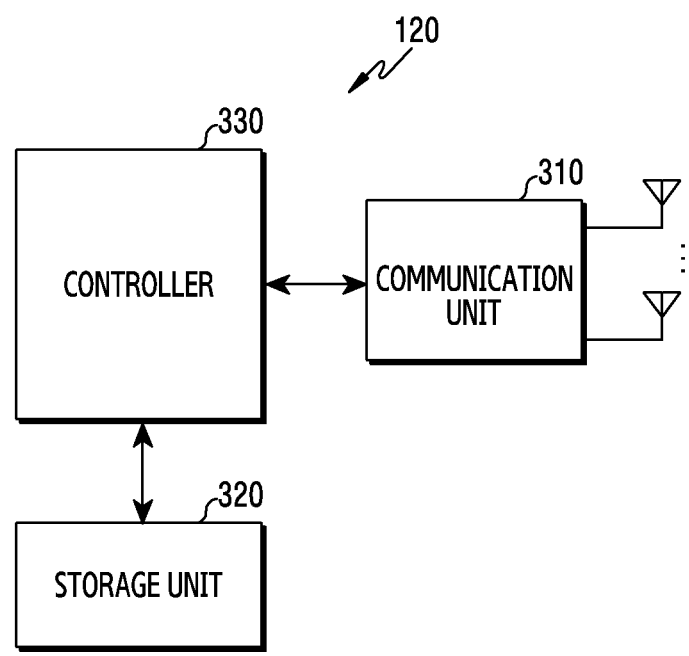
FIG. 3 illustrates the configuration of a UE in a wireless communication system according to various embodiments of the disclosure.

FIG. 3 illustrates the configuration of a UE in a wireless communication system according to various embodiments of the disclosure. The configuration illustrated in FIG. 3 may be understood as the configuration of the UE 120. The suffix "-unit" or "-er" used hereinafter may refer to a unit for processing at least one function or operation, and may be implemented as hardware, software, or a combination of hardware and software.

Referring to FIG. 3, the UE includes a communication unit 310, a storage unit 320, and a controller 330.

The communication unit 310 performs functions for transmitting and receiving a signal through a radio channel. For example, the communication unit 310 performs a function of conversion between a baseband signal and a bitstream according to a physical-layer standard of the system. For example, in data transmission, the communication unit 310 generates complex symbols by encoding and modulating a transmission bitstream. In data reception, the communication unit 310 reconstructs a reception bitstream by demodulating and decoding a baseband signal. Further, the communication unit 310 up-converts a baseband signal to an RF band signal, transmits the RF band signal through an antenna, and then down-converts the RF band signal received through the antenna to the baseband signal. For example, the communication unit 310 may include a transmission filter, a reception filter, an amplifier, a mixer, an oscillator, a DAC, and an ADC.

The communication unit 310 may include a plurality of transmission/reception paths. The communication unit 310 may include at least one antenna array including a plurality of antenna elements. On the hardware side, the communication unit 310 may include a digital circuit and an analog circuit (for example, a radio frequency integrated circuit (RFIC)). The digital circuit and the analog circuit may be implemented as a single package. The communication unit 310 may include a plurality of RF chains. The communication unit 310 may perform beamforming.

The communication unit 310 transmits and receives a signal as described above. Accordingly, all or some of the communication unit 310 may be referred to as a "transmitter", a "receiver", or a "transceiver". In the following description, transmission and reception performed through a radio channel are used to have a meaning including the processing performed by the communication unit 310.

The storage unit 320 stores data such as a basic program, an application, and configuration information for the operation of the UE. The storage unit 320 may include volatile memory, nonvolatile memory, or a combination of volatile memory and nonvolatile memory. The storage unit 320 provides stored data in response to a request from the controller 330.

The controller 330 controls the overall operation of the UE. For example, the controller 330 transmits and receives a signal through the communication unit 310. The controller 330 records data in the storage unit 320 and reads the same. The controller 330 may perform the functions of a protocol stack required by the communication standard. To this end, the controller 330 may include at least one processor or microprocessor, or may be a part of the processor. Further, the part of the communication unit 310 or the controller 330 may be referred to as a communications processor (CP). According to various embodiments, the controller 330 may control the UE to perform operations according to various embodiments described below.

Figure 4:
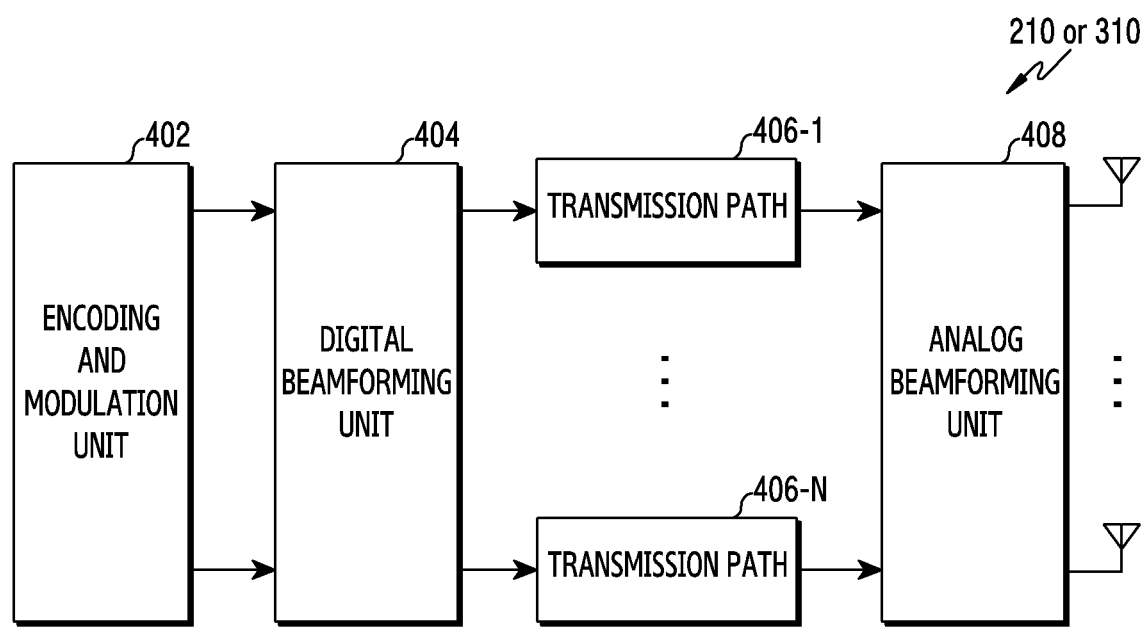
FIG. 4 illustrates the configuration of a communication unit in a wireless communication system according to various embodiments.

FIG. 4 illustrates the configuration of a communication unit in a wireless communication system according to various embodiments. FIG. 4 illustrates an example of the detailed configuration of the wireless communication unit 210 of FIG. 2 or the communication unit 310 of FIG. 3. Specifically, FIG. 4 illustrates elements for performing beamforming as the part of the wireless communication unit 210 of FIG. 2 or the communication unit 310 of FIG. 3.

Referring to FIG. 4, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For the channel encoding, at least one of low-density parity check (LDPC) code, convolution code, and polar code may be used. The encoding and modulation unit 402 generates modulation symbols by performing constellation mapping.

The digital beamforming unit 404 performs beamforming on a digital signal (for example, modulation symbols). To this end, the digital beamforming unit 404 multiplies modulation symbols by beamforming weights. The beamforming weight values may be used for changing the size and phase of the signal, and may be referred to as a "precoding matrix" or a "precoder". The digital beamforming unit 404 outputs digitally beamformed modulation symbols through the plurality of transmission paths 406-1 to 406-N. At this time, according to a Multiple-Input Multiple-Output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculator, a cyclic prefix (CP) inserter, a DAC, and an up-converter. The CP inserter is for an orthogonal frequency division multiplexing (OFDM) scheme, and may be omitted when another physical layer scheme (for example, a filter bank multi-carrier (FBMC)) is applied. That is, the plurality of transmission paths 406-1 to 406-N provides independent signal-processing processes for a plurality of streams generated through the digital beamforming. However, depending on an implementation scheme, some of the elements of the plurality of transmission paths 406-1 to 406-N may be used in common.

The analog beamforming unit 408 performs beamforming on an analog signal. To this end, the digital beamforming unit 404 multiplies analog signals by beamforming weights. The beamforming weights are used to change the size and phase of the signal. Specifically, the analog beamforming unit 440 may be variously configured according to a connection structure between the plurality of transmission paths 406-1 to 406-N and antennas. For example, each of the plurality of transmission paths 406-1 to 406-N may be connected to one antenna array. In another example, the plurality of transmission paths 406-1 to 406-N may be connected to one antenna array. In another example, the plurality of transmission paths 406-1 to 406-N may be adaptively connected to one antenna array or to two or more antenna arrays.

Figure 5:
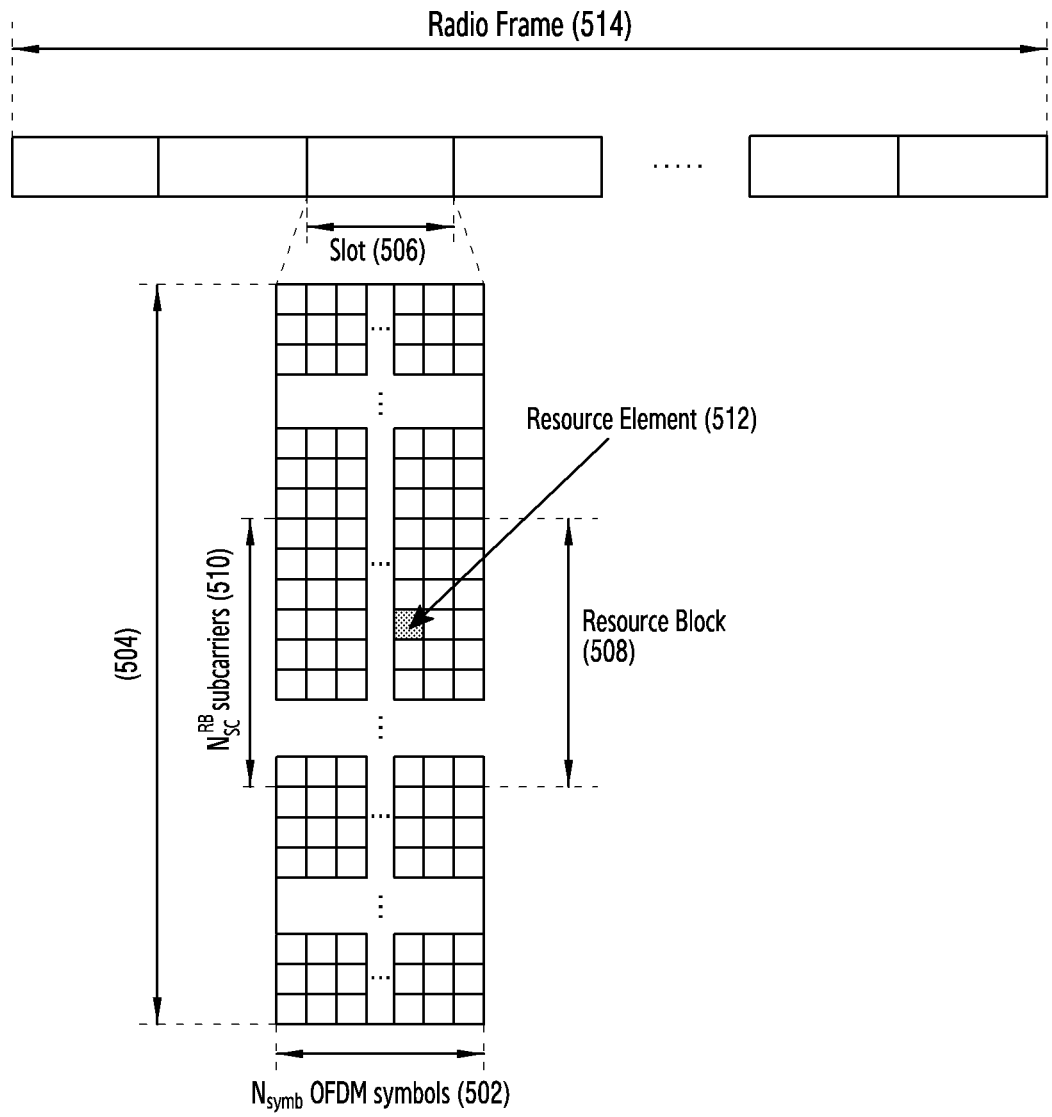
FIG. 5 illustrates the structure of resources in time-frequency domains in a wireless communication system according to various embodiments of the disclosure.

FIG. 5 illustrates the structure of resources in time-frequency domains in a wireless communication system according to various embodiments of the disclosure. FIG. 5 illustrates the basic structure of time-frequency domains that are radio resource areas in which data or control channels are transmitted in the downlink or the uplink. Hereinafter, in the disclosure, orthogonal frequency division multiplexing (OFDM) defined as time-frequency resources is illustrated as the resource structure, but resource structure forms in various schemes that can be divided by the time-frequency such as TDM, FDM, CDM, SC-FDMA, and the like may be defined.

Referring to FIG. 5, a horizontal axis indicates a time domain and a vertical axis indicates a frequency domain. The minimum transmission unit in the time domain is an OFDM symbol, and $N_{symb}$ OFDM symbols 502 are in one slot 506. For example, in the LTE or NR system, a length of a subframe is defined as 1.0 ms and a length of a radio frame 514 is defined as 10 ms. The minimum transmission unit of the frequency domain may be a subcarrier, and the carrier bandwidth included in a resource grid may include a total of NBW subcarriers 504.

A basic unit of resources in the time-frequency domains is a resource element (RE) 512 and may be indicated by an OFDM symbol index and a subcarrier index. A resource block may include a plurality of resource elements. In the LTE system, a resource block (RB) (or a physical resource block (PRB)) may be defined by $N_{symb}$ successive OFDM symbols in the time domain and $N_{SC}^{RB}$ successive subcarriers in the frequency domain. In the NR system, the resource block (RB) 508 may be defined by $N_{SC}^{RB}$ successive subcarriers 510 in the frequency domain. One RB 508 includes $N_{SC}^{RB}$ REs 512 in the frequency axis. In general, the minimum transmission unit of data is RB and the number of subcarriers is $N_{SC}^{RB}=12$. The frequency domain may include common resource blocks (CRBs). The physical resource block (PRB) may be defined in a bandwidth part (BWP) in the frequency domain. CRB and PRB numbers may be determined according to subcarrier spacing. A data transmission rate may increase in proportion to the number of RBs scheduled to the UE.

The UE may continuously move within a radio environment. In order to provide a robust communication environment to UEs, the BS performing scheduling is required to predict a more accurate channel state. In the current 3GPP standard, the scheduling is performed on the basis of an SRS transmitted by the UE (for example, channel reciprocity is satisfied in time division duplex (TDD)) or on the basis of CSI reported by the UE (for example, frequency division duplex (FDD) is satisfied) or the SRS or the CSI is not updated in every transmission time interval (TTI) which is the scheduling unit, so that the prediction of the channel state may not be accurate. Further, since continuous transmission of the SRS or frequency report of the CSI is a burden to the UE, a method by which the BS more accurately estimates the current channel state until the following channel information is acquired from periodically or intermittently obtained channel information is needed. Particularly, massive multiple input multiple output (MIMO) using a plurality of antennas to increase a channel gain is considered, and thus it is required to predict accurate channel parameters on various paths.

Hereinafter, in the disclosure, a situation in which the BS estimates a channel on the basis of the SRS transmitted by the BS-UE or the CSI reported by the UE is described as an example, but channel estimation according to various embodiments of the disclosure is not limited thereto. Another network entity other than the BS or a separate operation device included in the BS may perform channel estimation according to various embodiments described below or a CU or a device connected to the CU in distributed deployment may perform channel estimation. Further, an example of estimating a downlink channel from the BS to the UE is described, but it is apparent that the channel estimation according to the disclosure can be applied to uplink channel estimation from the UE to the BS or sidelink channel estimation between UEs.

A channel estimation device according to various embodiments of the disclosure predicts channel parameters on the basis of previous channel information obtained from an SRS or a PMI. The BS may determine the current channel state on the basis of the previous channel state and the currently acquired measurement information. Determining the channel state may be replaced with obtaining, acquiring, calculating, identifying, predicting, or estimating the channel state or the term having an equivalent meaning.

When estimating a channel (that is, calculating or predicting channel parameters), the BS should track parameters of a nonlinear function. The BS according to various embodiments of the disclosure may perform unscented Kalman filter (UKF)-based channel estimation in order to efficiently performed channel estimation with lower complexity than an extended Kalman filter (EKF) scheme. Hereinafter, in FIGS. 6A to 6C, a system model for UKF-based channel estimation according to the disclosure and functional elements for channel estimation are described.

Figure 6A:
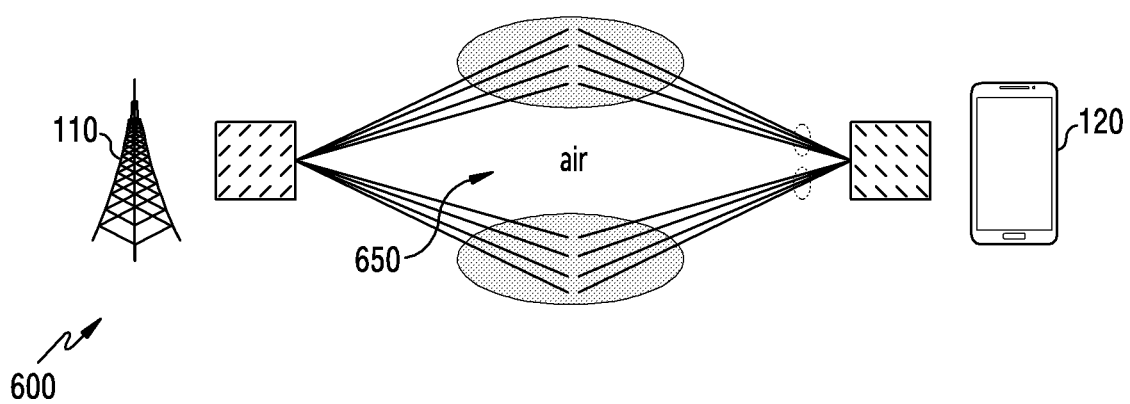
FIG. 6A illustrates an example of a system model in a wireless communication system according to various embodiments of the disclosure.

FIG. 6A illustrates an example of a system model in a wireless communication system according to various embodiments of the disclosure. An example of a system model for estimating a downlink channel between the BS and the UE is illustrated. The BS is the BS 110 of FIG. 1 and the UE is the UE 120 of FIG. 1. The resource structure of FIG. 5 is illustrated as an example of a resource structure for describing the system model.

Referring to FIG. 6A, a radio environment 600 may include a radio channel 605 between the BS and the UE. It is assumed that the UE transmits an SRS and the BS receives the same and estimates a channel Δt this time, the radio channel 650 may be dependent on a propagation path through a signal is transmitted, and the propagation path may be dependent on an antenna (q) at the transmitting side. A signal radiated from one antenna is provided to the receiving side through one or more paths in the air. Further, the radio channel 605 on each path may dependent on the time-frequency. That is, the radio channel 605 may be determined according to an antenna (q), a time (t), and a frequency (f). The radio channel may be indicated by a vector and expressed as shown in the following equation.

$$h_q(f, t) = \sum_{p=1}^{P} \gamma_{p,q} e^{-j2\pi(f\tau_p - v_p t)} \quad \text{Equation 1}$$

$h_q(f, t)$ denotes a predicted channel estimation value for time-frequency resources (t,f) in a $q^{th}$ antenna. $\tau_p$ denotes a delay parameter for a path $v_p$ denotes a Doppler parameter for the path p, and $\gamma_{p,q}$ denotes a complex weight for the antenna q on the path p. It is assumed that $\tau_p$ and $v_p$ are equally applied regardless of the antenna q and $\gamma_{p,q}$ is differently applied for each antenna.

An observed received signal may be expressed as shown in the following equation.

$$y_q(t_s, f_s) = \hat{h}_q(t_s, f_s) + n_q(t_s, f_s) \quad \text{Equation 2}$$

$y_q(t_s, f_s)$ denotes a received signal vector when a signal is transmitted in a $q^{th}$ antenna, $\hat{h}_q(t_s, f_s)$ denotes a radio channel vector when a signal is transmitted in the $q^{th}$ antenna in resources $(t_s, f_s)$, and $n_q(t_s, f_s)$ denotes a noise vector when a signal is transmitted in the $q^{th}$ antenna in resources $(t_s, f_s)$.

A frequency domain and frequency resources ($f_s$) may be defined as shown in the following equation.

$$f_s \in [0, \delta f, \ldots (N_{RB}-1)\delta f] \quad \text{Equation 3}$$

$N_{RB}$ denotes the number of RBs within a channel bandwidth and δf denotes the frequency size corresponding to one RB. For example, in the case of LTE, δf is 180 kHz. Further, for example, in the case in NR, δf is variably determined according to configured numerology.

A time domain and time resources ($t_s$) may be defined as shown in the following equation.

$$t_s \in [0, \Delta T, \ldots, (N_{RB}-1)\Delta T] \quad \text{Equation 4}$$

ΔT denotes an SRS periodicity and $N_{SRS}$ denotes the number of times in a total cycle. Meanwhile, the time domain expressed by the SRS is only an example, and the periodicity and scale in the time domain may be separately configured by higher-layer signaling (for example, CSI report configuration) when a channel is estimated by a CRS or a CSI-RS.

A channel response $\hat{h}_q(t_s, f_s)$ of the two-dimensional resource structure (time-frequency resources) of the $q^{th}$ antenna may be defined as follows, and may be expressed as shown in the following equation when vectorization of $\hat{h}_q(t_s, f_s)$ is first performed according to the frequency domain and then according to the time domain.

$$\tilde{h}_q = vec\{\hat{h}_q(t_s, f_s)\}, \tilde{y}_q = vec\{\tilde{y}_q(t_s, f_s)\} \quad \text{Equation 5}$$

Thereafter, each channel vector may be indicated by a nonlinear function of channel parameters. For example, each channel vector may be expressed as shown in the following equation.

$$\tilde{h}_q = vec\{\hat{h}_q(t,k)\} = s_q(\tau, v, \gamma_q) = B(\tau, v) \cdot \gamma_q = B_{tf}(\tau, v) \circ B_f(\tau) \cdot \gamma_q \quad \text{Equation 6}$$

A parameter vector $\tau$, $v \in \mathbb{R}^P$ denotes a vector having P real numbers, $\gamma_q \in \mathbb{C}^P$ denotes a vector having P complex numbers, and an operator "$\circ$" denotes a Khatri-Rao product corresponding to a column-wise Kronecker product. An example between two 2×2 matrixes of the Khatri-Rao product is described below.

$$A \diamond B = \begin{bmatrix} a_{11} & a_{12} \\ a_{21} & a_{22} \end{bmatrix} \diamond \begin{bmatrix} b_{11} & b_{12} \\ b_{21} & b_{22} \end{bmatrix} = \begin{bmatrix} a_{11}b_{11} & a_{12}b_{12} \\ a_{11}b_{21} & a_{12}b_{22} \\ a_{21}b_{11} & a_{22}b_{12} \\ a_{21}b_{21} & a_{22}b_{22} \end{bmatrix} \quad \text{Equation 7}$$

Further, a matrix $B_f(\tau)$ means an intra-band frequency response influenced by the path delay $\tau$, $B_f(\tau) \in \mathbb{C}^{M_f \times P}$, and the mapping relation between input and output parameters ((input-output mapping) is $\mathbb{R}^P \to \mathbb{C}^{M_f \times P}$. $M_f$ is the number of RBs within the corresponding subband. For example, the matrix $B_f(\tau)$ indicates an intra-subband SRS frequency response due to the path delay, and $[B_f(\tau)]_p$ which is a $p^{th}$ column may be expressed as shown in the following equation.

$$[B_f(\tau)]_p = e^{-j2\pi x_1 \delta f \tau_p} \quad \text{Equation 8}$$

where $$x_1 = \left[ -\left[\frac{M_f}{2}\right], -\left[\frac{M_f}{2}\right] + 1, \ldots, \left(\left[\frac{M_f}{2}\right] - 1\right) \right]^T$$

Similarly, a matrix $B_{tf}(\tau, v) \in \mathbb{C}^{N_{SRS} \times P}$ means an inter-band frequency response and is a function of a path delay vector $\tau$ and a Doppler vector $v$. The mapping relation between the input and output parameters of the function is $(\mathbb{R}^P, \mathbb{R}^P) \to \mathbb{C}^{M_f \times P}$, and $N_{SRS}$ denotes the number of SRS subbands simultaneously stored in the buffer and processed. $[B_{tf}(\tau, v)]_p$ which is a $p^{th}$ column of the matrix $B_{tf}(\tau, v)$ may be expressed as follows.

$$[B_{tf}(\tau, v)]_p = e^{-j2\pi(m\Delta f \tau_p - n\Delta t v_p)} \quad \text{Equation 9}$$

$\Delta f$ denotes an inter-band frequency interval (for example, 24RB*180 KHz in LTE), and $\Delta t$ denotes a sampling interval between adjacent SRS subbands. m denotes a band index and n denotes a time index. According to an embodiment, $\Delta f$ and m are dependent on a communication system (for example, LTE or NR), subcarrier spacing (SCS), and a band location, and $\Delta t$ and n may be dependent on an SRS configuration and a CSI configuration (for example, a CSI resource configuration (CSI-RS configuration) or a CSI report configuration)). When an SRS hopping pattern is configured, m and n may be determined according to the hopping pattern. A detailed example is described with reference to FIG. 6C.

For signal processing, and efficiency of parameter estimation, $q^{th}$ vectors $\tilde{h}_q$ and $\tilde{y}_q$ may be expressed by concatenated overall vectors through concatenation as shown in the following equation.

$$\tilde{h} = vec\{[\tilde{h}_{q=1}, \tilde{h}_{q=2}, \ldots, \tilde{h}_{q=N_{ant}}]\}$$

$$\tilde{y} = vec\{[\tilde{y}_{q=1}, \tilde{y}_{q=2}, \ldots, \tilde{y}_{q=N_{ant}}]\} \quad \text{Equation 10}$$

In some embodiments, the vector signal model for the SRS may be expanded to consider a plurality of eNB antennas ($N_{ant}$). At this time, it may be assumed that the path delay and the Doppler are common in $N_{ant}$ antennas. The channel vector in [Equation 6] above may be expressed as shown in the following equation.

$$\tilde{h} = s(\tau, v, \gamma) = \Gamma \circ B_{tf} \circ B_f 1 \quad \text{Equation 11}$$

A channel vector $\tilde{h} = \Gamma \circ B_{tf} \circ B_f 1$ is expressed by a nonlinear function $s(\ldots)$ for channel parameters $\{\tau, v, \gamma_q\}$, $\Gamma$ is a path weight matrix having a dimension of $N_{ant} \times P$, and each row includes a path weight for one antenna. 1 denotes all column vectors having a dimension of P×1.

More specifically, the channel vector may be expressed by a sum of column vectors for respective paths. For example, the channel vector may be expressed as shown in the following equation.

$$\tilde{h} = \sum_{i=1}^{P} \Gamma_i \otimes B_{tf,i} \otimes B_{f,i} = \begin{bmatrix} \gamma_{11}B_1 + \gamma_{12}B_2 + \cdots \gamma_{1P}B_P \\ \gamma_{21}B_1 + \gamma_{22}B_2 + \cdots \gamma_{2P}B_P \\ \vdots \\ \gamma_{N_{ant}1}B_1 + \gamma_{N_{ant}2}B_2 + \cdots \gamma_{N_{ant}P}B_P \end{bmatrix} \quad \text{Equation 12}$$

$B_p = B_{tf,p} \otimes B_{f,p}$ and $B_p$ denotes a $p^{th}$ column of $B(B = B_t \circ B_f)$.

When the parameters are considered, variables of parameters defining the channel vector may include $\tau$, $v$, $\Gamma$. That is, an object of channel estimation is defined as optimization of an objective function finally having channel parameters ($\tau$, $v$, $\Gamma$) as parameters. For example, channel estimation may include a scheme for acquiring channel parameters ($\tau$, $v$, $\Gamma$) that satisfy the following equation in consideration of the above-described channel vectors.

$$\min_{\tau, v, \Gamma} \|\tilde{h} - \tilde{y}\|^2 = \min_{\tau, v, \Gamma} \sum_{q=1}^{N_{ant}} \|\tilde{h}_q - \tilde{y}_q\|^2 \quad \text{Equation 13}$$

In the system model, examples of the channel parameters required for channel estimation have been described. At this time, in some embodiments, the SRS may be damaged by Gauss noise following white nose, and noise may be given as zero mean complex Gaussian following a covariance matrix of $N_0 I$. That is, the nonlinear function (s) according to the channel parameters ($\tau, v, \Gamma$) may be considered for a received signal vector as well as the channel vector. For example, the received signal vector may be expressed as shown in the following equation.

$$\tilde{y} = \tilde{h} + n_0 = s(\tau, v, \gamma) \quad \text{Equation 14}$$

UE mobility is successive. That is, a channel change according to movement of the UE is also successive, and parameters for the path delay and Doppler have the time correlation. Accordingly, the channel estimation device according to various embodiments of the disclosure may use a state space model in order to use and improve accuracy of estimation of parameters. The channel estimation device may configure state vectors and the state space model in various schemes on the basis of the system model.

In some embodiments, the channel estimation device may configure a state vector $\theta_k$ of a $k^{th}$ time on the basis of a path delay vector $\tau_k$, a path Doppler vector $v_k$, an antenna-dependent path amplitude $\alpha=|\gamma|$, an antenna-dependent path phase $\phi=\text{angle}(\gamma)$, a change rate of path Doppler $\Delta v_k$, and a change rate of the path delay in the corresponding state vector $\Delta\tau_k$. For example, the state vector $\theta_k$ may be defined as shown in the following equation.

$$\theta_k=[\tau_k^T, v_k^T, \Delta\tau_k^T, \Delta v_k^T, \alpha_k^T, \phi_k^T]^T \qquad \text{Equation 15}$$

Further, in some embodiments, the antenna-dependent path amplitude and path phase may be removed from the state vector to reduce the size of the state vector. According to an embodiment, in order to update the path weight including both the amplitude and the phase, least-square calculation may be used. The channel estimation device may configure a state vector $\theta_k$ of a $k^{th}$ time on the basis of a path delay vector $\tau_k$, a path Doppler vector $v_k$, a change rate of path Doppler $\Delta v_k$, and a change rate $\Delta\tau_k$ of the path delay in the corresponding state vector. For example, the state vector $\theta_k$ may be defined as shown in the following equation.

$$\theta_k=[\tau_k^T, v_k^T, \Delta\tau_k^T, \Delta v_k^T]^T \qquad \text{Equation 16}$$

Further, in some embodiments, a change speed from the state vector may be additionally removed to reduce the size of the state vector. This is because the change in the path delay and Doppler by lapse of time may be generated using state noise and thus influence by the change speed may be considered. The channel estimation device may configure the state vector $\theta_k$ of the $k^{th}$ time on the basis of the path delay vector $\tau_k$ and the path Doppler vector $v_k$. For example, the state vector $\theta_k$ may be defined as shown in the following equation.

$$\theta_k=[\tau_k^T, v_k^T]^T \qquad \text{Equation 17}$$

The channel estimation device according to various embodiments may identify a state vector to be configured on the basis of the channel state according to time. According to an embodiment, in a region in which a change in the channel condition is not large (for example, most UEs are concentrated on a building or static UEs exist), the channel estimation device may perform channel estimation by configuring the state vector defined by small parameters. According to an embodiment, in a region in which a change in the channel state is regular according to a predetermined period, the channel estimation device may perform channel estimation by inserting constant values according to the time k into the state vector. According to an embodiment, when it is difficult to predict the channel state or fluctuation therein is relatively extreme, the channel estimation device may perform channel estimation by inserting as many variables as possible into the state vector.

In FIG. 6A, the parameters of the radio channel and the system model for performing channel estimation have been described. Hereinafter, FIG. 6B illustrates operations of a channel estimation device (for example, the BS) for predicting the parameters.

Figure 6B:
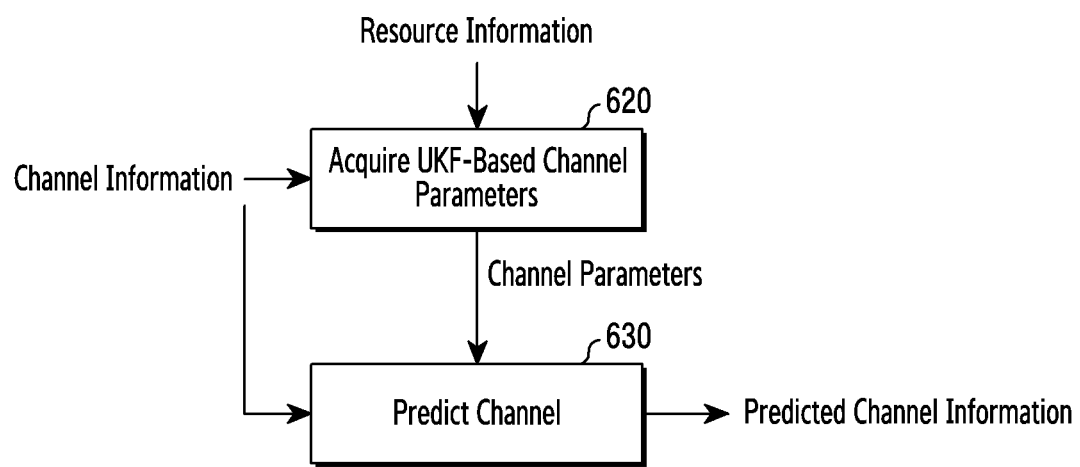
FIG. 6B illustrates a functional configuration of prediction of channel parameters in a wireless communication system according to various embodiments of the disclosure.

FIG. 6B illustrates a functional configuration of prediction of channel parameters in a wireless communication system according to various embodiments of the disclosure. As the channel parameters, at least one of the channel parameters of the system model mentioned in FIG. 6A may be used. Hereinafter, a situation in which the BS estimates a downlink channel with the UE is described.

Referring to FIG. 6B, prediction of channel parameters according to various embodiments of the disclosure may include two operations.

1) UKF-Based Channel Parameter Acquisition 620

The BS may perform UKF-based channel estimation. The BS may perform UKF-based channel estimation on the basis of channel information and resource information. That is, inputs for UFK-based channel estimation may include channel information and resource information.

1-1. Channel Information

Channel information according to various embodiments may be acquired in various methods. The BS may acquire channel information before performing a channel estimation procedure. Acquired channel information is stored in a buffer. The buffer may include an SRS buffer or a CSI buffer. The SRS buffer may store reception values for SRSs or SRS-based channel estimation values. The CSI buffer may store CSIs received from the UE. The channel information may include noise information.

The channel information may be acquired in various methods. In some embodiments, the BS may perform channel estimation on the basis of SRSs received from the UE. In a TDD system, channel reciprocity is assumed. That is, a downlink channel can be estimated from an uplink signal. The BS may perform SRS-based channel estimation in the TDD system. At this time, an SRS transmission period, locations of resources through which SRSs are transmitted (time resources, frequency resources, and the like), the number of antennas of the UE for transmitting SRSs, whether to perform SRS beamforming (for example, an SRS resource indicator (SRI)) may be determined on the basis of SRS configuration information which the BS transmits to the UE. The BS may determine the SRS configuration of the corresponding UE for smooth channel estimation.

In other embodiments, the BS may perform channel estimation on the basis of CSI from the UE. The BS may transmit cell-specific reference signals (CRSs) or CSI-reference signals (RSs) to the UE. The UE may generate CSI on the basis of the received CRSs or CSI-RSs. The CSI may include various parameters. The CSI may include at least one of a CSI-RS resource indicator (CRI), a rank indicator (RI), a precoding matrix indicator (PMI), a channel quality indicator (CQI), or a layer indicator (LI). The CRI indicates resources of the CSI-RS related to a preferred beam. The RI indicates information related to a channel rank and refers to the number of streams received through the same resources. The PMI may indicate a precoding matrix recommended to the BS when the number of layers known to the RI is used. The PMI is a value reflecting a spatial characteristic of the channel and the UE may indicate the recommended precoding matrix in the form of an index. The precoding matrix may be stored in the BS/UE in the form of a codebook including a plurality of complex weights. The CQI indicates a modulation scheme and a code rate for transmission of a PDSCH which can be received at a block error rate (BLER) equal to or lower than a predetermined value when the RI and the PMI recommended by the UE are used.

The BS may perform channel estimation on the basis of the CSI received from the UE. At this time, in order to more accurately predict parameters required for channel estimation, the BS may configure CSI in a necessary scheme. The CSI configuration may include at least one of a CSI measurement configuration, a CSI reporting configuration, and a CSI-RS configuration. The BS may adaptively generate the CSI configuration according to a necessary channel estimation scheme and transmit the generated CSI configuration to the UE through RRC signaling.

In the LTE system, while the CRS is an always-on signal, the CSI may be periodically or aperiodically reported. Further, the CSI-RS may be periodically or aperiodically reported. The BS predicts a channel from the periodically received CSI, but may make a request for aperiodic CSI reporting as necessary according to an embodiment (for example, CSI reporting on a physical uplink shared channel (PUSCH)). In the NR system, the CSI and the CSI-RS are more flexibly designed. That is, the CSI-RS may be periodically transmitted, semi-fixedly transmitted, or aperiodically transmitted. Further, the BS may configure the UE to periodically, semi-fixedly, or aperiodically report CSI. The BS predicts a channel on the basis of periodic CSI-RS and periodic CSI reporting, but may reconfigure CSI-RS and CSI reporting as necessary according to an embodiment. That is, the disclosure describes periodic transmission and periodic reporting as examples, but they are only examples and CSI-RS transmission and CSI reporting may be configured in various ways.

Meanwhile, in the case of FDD, channel reciprocity is not satisfied, and thus the BS may perform channel estimation on the basis of CSI more effectively than the SRS. However, even in the FDD system, the SRS can be used through channel calibration.

Since the BS (for example, gNB or eNB) has difficulty in acquiring channel information in all time-frequency resources, the BS receives SRSs only in some resource areas or receives only CSI in some resource areas. For example, CRSs in LTE are transmitted over the entire band, but only four antennas are supported, and thus it is difficult to perform smooth channel estimation in an environment of 8 Tx or more antennas after LTE Release 10 and CSI-RSs are not transmitted over the entire band. That is, the BS acquires only sampled channel information specified for some time (for example, in units of slots) or some frequencies (for example, in units of RBs) among all resources, and accordingly accurate channel estimation is difficult.

In TDD massive MIMO, a MU-MIMO gain is observed only in static UEs on the basis of the result of observation of gains of UEs. The EKF scheme transform the nonlinear function for channel parameters to the linear function through approximation (linearization). Accordingly, the EKF scheme causes information loss for second order or higher statistical information. Accordingly, channel information varying in the time-frequency cannot be smoothly predicted according to movement of the UE. Accordingly, the BS according to various embodiments of the disclosure may provide more robust precoding and scheduling to the UE by estimating in advance a channel corresponding to the current time on the basis of the UKF scheme having channel information (that is, raw channel information) (for example, CSI or SRS) acquired from the UE as an input. The BS may estimate in advance a channel in every scheduling unit (TTI) (for example, slot).

1-2. Resource Information

Resource information according to various embodiments may be variously configured. In some embodiments, resource information may include current time-frequency resources ($t_s$, $f_s$). In some embodiments, resource information may include time information. The time information may include a period of periodic CSI reporting, the number of measurements, the number of CSI transmissions, the number of reports of aperiodic CSI reporting, a reporting time, and the like. In some embodiments, the resource information may include frequency information. The frequency information may include an RB area (for example, bandwidth part (BWP) information) in which channel estimation is performed in a frequency domain, a channel bandwidth, an SCS, a frequency hopping pattern, and numerology. In some embodiments, the resource information may include spatial information. The spatial information may include beam information (for example, beam indexes such as a CRI, an SSBRI, and an SRI), QCL parameters (for example, QCL types A, B, C, and D), and antenna port information.

1-3. UKF-Based Channel Estimation

The BS may acquire channel parameters by performing UKF-based channel estimation on the basis of channel information and resource information. The BS may output the acquired parameters for operation 630. For example, the BS may acquire the channel parameters for each path. The parameters for each channel may include a delay parameter ($\tau$), a Doppler parameter ($v$), and a complex weight ($\gamma_q$). According to an embodiment, the delay parameter and the Doppler parameter may be values varying depending on a path (p). According to an embodiment, the complex weight is a channel parameter reflecting a spatial weight and may be a function of the antenna (q) and the path (p). For example, the parameters for each channel may include amplitude ($\alpha$) and phase ($\phi$). The parameters may be used for a Type II codebook defined in the 3GPP. When the UE transmits a Type II codebook-based PMI feedback, the BS may more effectively estimate a channel vector through the corresponding parameters. Further, for example, the parameters for each channel may further include a delay path change rate $\Delta\tau_k$ and a Doppler change rate $\Delta v_k$.

Acquisition of the UKF-based channel parameters means a process of acquiring channel parameters of state vectors defining a channel using the UKF. Various channel parameters may be defined according to how the BS configures the state vectors defining the channel. For example, channel parameters may include at least one of the parameters related to the system model illustrated in FIG. 6A.

The UKF is one type of the Kalman filter. The Kalman filter is a recursive filter for estimating a state of a linear model on the basis of a measurement value including noise and is used to estimate combination distribution of the current state variable (or state vector) on the basis of the past measurement value. A recursive algorithm of the Kalman filter may include two steps of prediction and update. In the prediction step, the BS predicts the current state vector and accuracy. Thereafter, after the current state vector is really measured, the current state vector is updated by reflecting a difference between the measurement value predicated on the basis of the previously estimated state vector and the real measurement value in the update step. Although it is not illustrated in FIG. 6B, the update step may be performed again whenever the CSI buffer or the SRS buffer is updated or the resource configuration is changed (for example, the change in numerology). According to an embodiment, the update step may be performed the smaller number of times than prediction. According to an embodiment, the update step may be performed the same number of times as prediction.

Meanwhile, the Kalman filter is based on a linear model, and thus it is not easy to apply the Kalman filter to a nonlinear model such as a channel varying depending on time resources, frequency resources, or spatial resources. When a state transition and an observation model (a prediction and update function) are very nonlinear, an extended Kalman filter may show low performance. Accordingly, the proposed EKF scheme is a scheme for performing Taylor series and linearization approximation on the nonlinear function including parameters to be estimated and introducing the same into the Kalman filter operating on the basis of the linear function to track the parameters within the nonlinear function. However, the EKF scheme causes an error in a situation in which secondary elements cannot be accurately reflected by the linearization approximation.

In order to solve the problem, the BS according to various embodiments may perform channel estimation on the basis of the UKF. Compared to an extended Kalman filter (EKF)-based scheme capable of estimating channel parameters within the nonlinear function, the UKF scheme is a scheme obtained by combining uniform transform (UT) capable of elaborately selecting 1) 2n+1 samples (sigma points) called sigma points and 2) weights (W) of the samples and the Kalman filter. In the UKF, in order to obtain a minimum set of sample points around the mean, a deterministic sampling technology known as unscented transform is used. The sigma points are transmitted through the nonlinear function and mean and covariance are calculated for transformed points. The BS may predict a state vector on the basis of the sigma points so as to have the more accurate channel estimation result. Detailed operations are described with reference to FIGS. 10 to 12.

2) Channel Prediction 630

The BS may perform channel prediction. The channel prediction is a procedure of predicting a channel at a time point after channel information acquisition according to predicted channel parameters, that is, a state vector value. The BS may determine a real channel (for example, $h_q(f, t)$ in [Equation 1]) in current time-frequency resources on the basis of channel information and the state vector. The channel may be expressed by a nonlinear function of channel parameters. The channel parameters may be parameters included in the state vector derived in previous operation 610. The BS may determine the final channel vector on the basis of the model according to the linear function (for example, [Equation 6] or [Equation 11]) from the state vector. Before the next channel information (for example, the CSI buffer or the SRS buffer) is updated, the BS may determine channel vectors on the basis of the output in operation 610.

For example, when the system model of FIG. 6A is assumed, the channel may be based on a sum of a maximum of P basis waveforms. For example, P sinusoidal waveforms indexed by $\{p=1, 2, \ldots, P\}$ are used, and each signal is parameterized by a $p^{th}$ signal delay $\tau_q$ and a $p^{th}$ signal Doppler shift $v_p$. The BS may receive a sample from the CSI buffer or the SRS buffer as an input and derive a signal delay, a Doppler shift, and a combination weight. Thereafter, the BS may output a linear combination of the P basis waveforms as a predicted channel at the time t and the frequency f. The BS may predict a channel in real time before [Equation 3], [Equation 4], and the next channel information (for example, the CSI buffer or the SRS buffer) are updated.

Figure 6C:
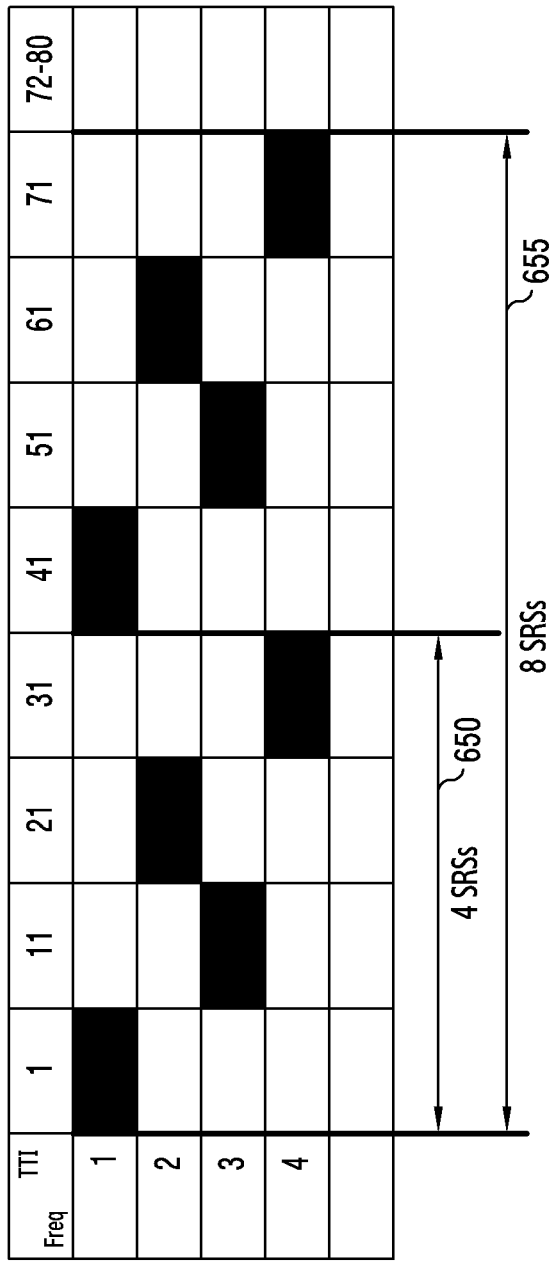
FIG. 6C illustrates an example of a hopping pattern in a wireless communication system according to various embodiments of the disclosure.

FIG. 6C illustrates an example of a hopping pattern in a wireless communication system according to various embodiments of the disclosure. The SRS may be hopped and transmitted. SRS hopping in LTE is illustrated.

Referring to FIG. 6C, a 4-SRS hopping pattern 650 and an 8-SRS hopping pattern 655 may be defined. The horizontal axis is the time domain, and each index indicates a number of an TTI. The vertical axis is the frequency domain and indicates a subband. A channel response may be configured as shown in [Equation 9] above. At this time, for example, in the case of the 4-SRS hopping pattern 650, m may sequentially indicate $\{0, 2, 1, 3\}$ and n may sequentially indicate $\{0, 1, 2, 3\}$. The BS may perform measurement in units of 40 ms and may update the channel prediction result. The BS may update the same frequency channel in units of 40 ms. Further, for example, in the case of the 8-SRS hopping pattern 655, m may sequentially indicate $\{0, 2, 1, 3, 0, 2, 1, 3\}$ and n may sequentially indicate $\{0, 1, 2, 3, 4, 5, 6, 7\}$. The BS may perform measurement in units of 80 ms and may update the channel prediction result. The BS may update the same frequency channel in units of 80 ms. Meanwhile, the same subband is repeated in units of 40 ms, and according to another embodiment, the BS may update the same frequency channel in units of 40 ms.

Figure 7:
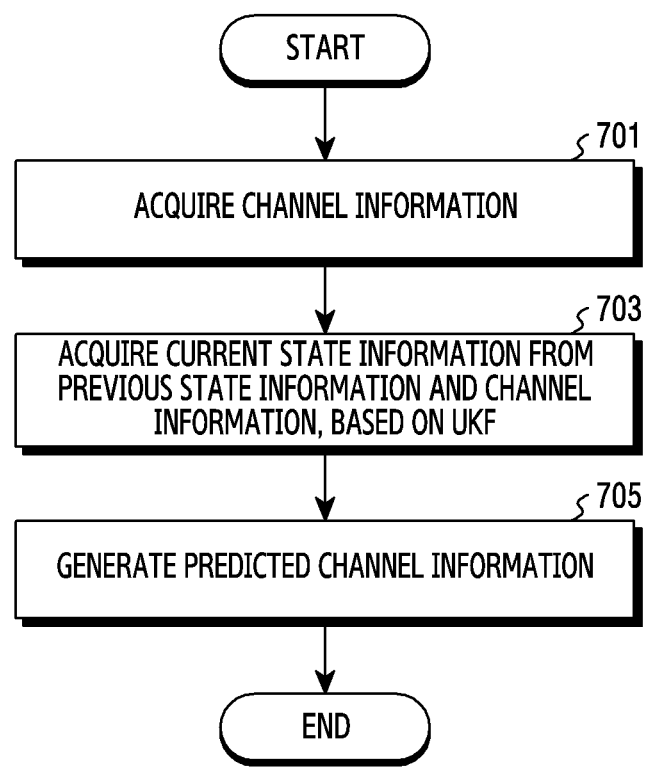
FIG. 7 is a flowchart illustrating the operation of a device for unscented Kalman filter (UKF)-based channel estimation in a wireless communication system according to various embodiments of the disclosure.

FIG. 7 is a flowchart illustrating the operation of a device for unscented Kalman filter (UKF)-based channel estimation in a wireless communication system according to various embodiments of the disclosure. The BS 110 of FIG. 1 is illustrated as a device performing channel estimation.

In operation 701, the BS may acquire channel information. The BS may acquire channel information for a downlink channel with the UE. In some embodiments, the BS may acquire channel information from an SRS. The UE may transmit the SRS to the BS. The BS may acquire channel information for the downlink channel by measuring received SRSs. Further, in some embodiments, the BS may receive a CSI from the UE. The BS may transmit reference signals for CSI to the UE. For example, the BS may transmit a CRS. Further, for example, the BS may transmit a CSI-RS. The UE may generate CSI on the basis of the CRS or the CSI-RS. The CSI may include a CRI, an RI, a PMI, a CQI, or an LI. Hereinafter, in the disclosure, a PMI is described as a CSI configuration element for deriving a channel vector, but other CSI configuration elements may be used for channel prediction. The BS may acquire channel information for the downlink channel on the basis of the CSI received from the UE. The BS may acquire channel information at a time point $t_0$. The channel information indicates a state of the downlink channel at the time point $t_0$.

In operation 703, the BS may acquire current state information from the previous state information and the received channel information on the basis of an unscented Kalman filter (UKF). The previous state information may be state information estimated before the time point $t_0$. For example, channel parameters estimated on the basis of the channel information acquired at a time point $t_0-P$ may be included. P may be a periodic (for example, an SRS period or a PMI report period) on which the channel information is acquired. The current state information may include channel parameters estimated at the time point $t_0$.

The BS according to various embodiments of the disclosure may acquire the current state information on the basis of the UKF in order to more accurately predict a multidimensional channel state. That is, the previous channel state information and the current channel state information may be information continuously updated according to a recursive algorithm of the UKF. The current state information according to the UKF may include channel parameters estimated on the basis of prediction from the previous state information and measurement and correction from channel information acquired from the UE.

In operation 705, the BS may generate predicted channel information. The BS may generate the predicted channel information on the basis of the current state information. The current state information is the latest state information from the current time point, and the predicted channel information is information indicating a real channel state estimated at the current time point. The BS may generate the predicted channel information on the basis of the current state information before the following channel information is received. The BS may generate the predicted channel information at a time point of $t_0+\Delta t(<t_1, t_1$ being a time point at which the following channel information is received) on the basis of state information including the channel parameters acquired at the time point $t_0$. At this time, the BS may predict a change in each of the channel parameters in time-frequency resources according to $\Delta t$ and generate predicted channel information on the basis of the predicted change. For example, the BS may generate predicted channel information on the basis of the channel model in [Equation 1]. The BS may determine predicted channel information on the basis of state information according to the UKF. In the state information according to the UKF, high-dimensional channel states include low-dimensional channel parameters (for example, a delay parameter ($\tau$), a Doppler parameter (v), and a complex weight ($\gamma_q$)), and thus complexity of a channel prediction procedure of the BS may be reduced. Further, the BS designs a channel model according to a nonlinear function including the corresponding channel parameters, thereby reducing deterioration of the performance due to linearization approximation of the conventional EKF.

Figure 8A:
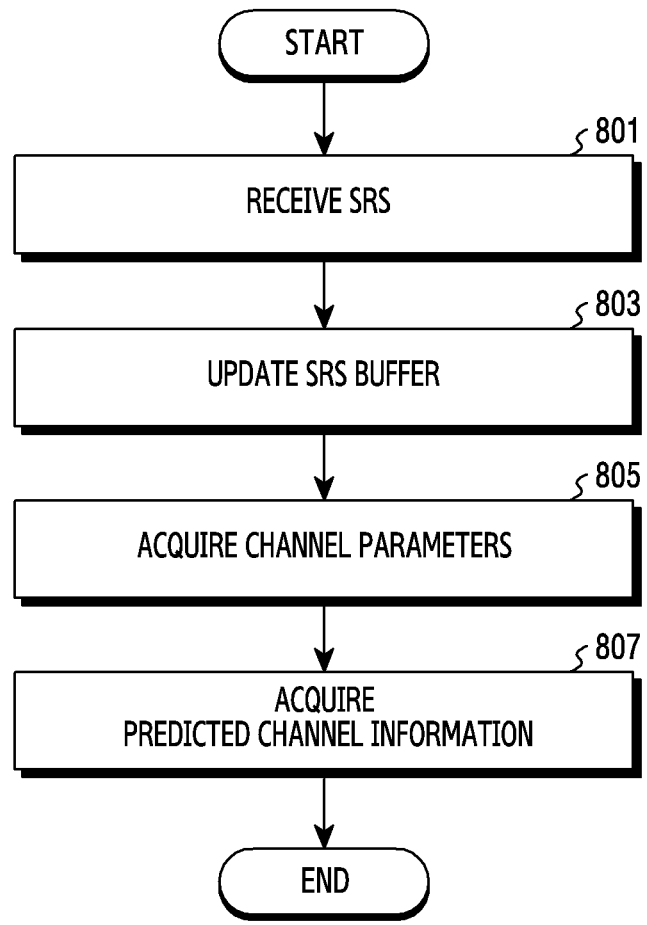
FIG. 8A is a flowchart illustrating the operation of a device for channel estimation using a sounding reference signal (SRS) in a wireless communication system according to various embodiments of the disclosure.

FIG. 8A is a flowchart illustrating the operation of a device for channel estimation using a sounding reference signal (SRS) in a wireless communication system according to various embodiments of the disclosure. The BS 110 of FIG. 1 is illustrated as a device performing channel estimation.

Referring to FIG. 8A, in operation 801, the BS may receive SRSs. The BS may receive SRSs according to a predetermined condition. According to an embodiment, the SRSs may be periodically transmitted. The BS may periodically receive SRSs. According to an embodiment, the SRSs may be transmitted in different subbands within a predetermined frequency band (for example, an activated UL BWP). That is, the BS may receive SRSs for respective subbands according to a frequency hopping pattern.

The BS may measure the received SRSs and acquire required channel information (for example, a CSI and other channel qualities). The channel quality may be at least one of beam reference signal received power (BRSRP), reference signal received power (RSRP), reference signal received quality (RSRQ), received signal strength indicator (RSSI), signal to interference and noise ratio (SINR), carrier to interference and noise ratio (CINR), signal to noise ratio (SNR), error vector magnitude (EVM), bit error rate (BER), and block error rate (BLER).

The BS may acquire the measurement result for the SRS. At this time, the measurement result for the SRS may be stored in units of time-frequencies. That is, SRSs received during one period from the time $t_0$ may be expressed as shown in the following equation.

$$h_{SRS}(t_0, \{f \in bW_s\}) \quad \text{Equation 18}$$

Here, $bW_s$ denotes a set of bands in which SRSs are transmitted.

In operation 803, the BS may update an SRS buffer. The SRS buffer may include the measurement result of the received SRS. The BS may update the SRS buffer on the basis of the measurement result acquired in operation 801. The BS may manage the SRS buffer according to time-frequency resources. For example, the BS may manage the SRS buffer in units of specific frequency domains or in units of time domains. The specific frequency domains may be configured in units of at least one of subbands, bandwidth parts (BWPs), channel bandwidths, and carrier frequencies. Further, the time domains may be configured in units of SRS periods, TTIs, or periods in which frequency domains are repeated.

According to an embodiment, the SRS buffer may be managed in units of SRS transmission periods. For example, when an SRS buffer capacity is a period A, the SRS buffer may have the form of $\{F_0, F_2, \ldots, F_{A-1}\}$. At this time, when the SRS measurement result for a first bandwidth within the SRS buffer is updated, $F_0$ may be updated at to as shown in the following equation. $F_0$ of the SRS buffer may move to $F_1$, $F_1$ may move to $F_2$, and $F_{A-2}$ may move to $F_{A-1}$, and $F_{A-1}$ may be removed.

$$F_0 = \{h_{SRS}(t_0, \{f \in bW_{s=0}\}), \ldots\} \quad \text{Equation 19}$$

In operation 805, the BS may acquire channel parameters. The BS may acquire the channel parameters on the basis of the SRS buffer. The BS may acquire the channel parameters on the basis of the SRS measurement result for each time-frequency resource. The channel parameters according to various embodiments may be parameters included in the state vector ($\theta_k$) of the UKF. At this time, the parameters included in the state vector may include at least one of channel parameters illustrated in the system model of FIG. 6A. For example, the channel parameters may include at least one of a delay parameter, a Doppler parameter, a change value of the delay parameter, a change value of the Doppler parameter, and an amplitude and phase of a signal. For example, the state vector at the time $t_0$ may be determined as shown in the following equation.

$$\theta(t_0) = [\tau, \Delta\tau, v, \Delta v, \gamma] \quad \text{Equation 20}$$

In an operation 807, the BS may acquire predicted channel information. The predicted channel information may include channel vectors before the next SRS is received and channel information is updated after the time interval $t_0$ (for example, in the case of a period of T, before $t_0+T$ from $t_0$). The state vector has been updated on the basis of the received SRSs, and thus the BS may predict the current channel vector on the basis of the channel parameters of operation 805 before the next SRS is received. The BS may derive predicted channel information (for example, channel vectors and channel parameters) in each time interval between $t_0$ and $t_0+T$, that is, $t_0+1, t_0+2, \ldots, t_0+T-1$. For example, the BS may derive channel vectors according to the following equation.

$$\hat{h}_{\theta(t_0)}(t_0+1, \{f\}), \ldots, \hat{h}_{\theta(t_0)}(t_0+T-1, \{f\}) \quad \text{Equation 21}$$

$\hat{h}_{\theta_{t_0}}$ denotes a channel vector in a state vector ($\theta_{t_0}$) time index t and a frequency index f.

Figure 8B:
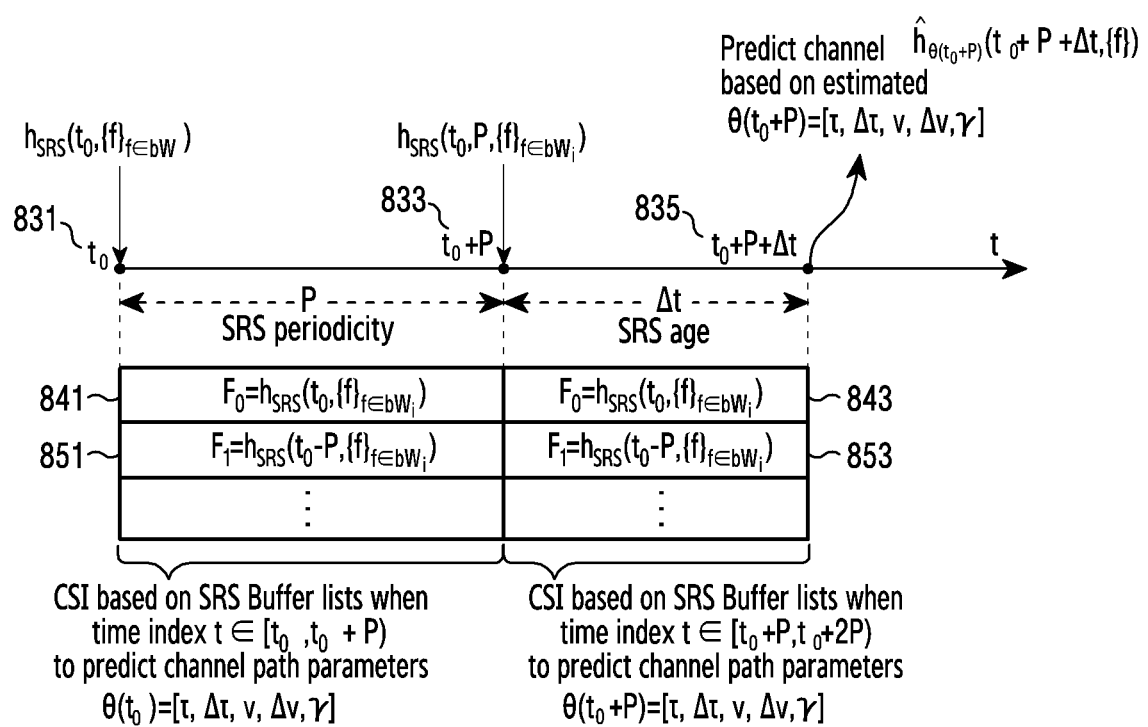
FIG. 8B illustrates an example of channel estimation using an SRS in a wireless communication system according to various embodiments of the disclosure.

FIG. 8B illustrates an example of channel estimation using an SRS in a wireless communication system according to various embodiments of the disclosure. In FIG. 8B, a process of obtaining an SRS buffer change and predicted channel information by the lapse of time is described. The predicted channel information is channel information after a time point at which channel information is received and refers to information determined on the basis of an estimation value of the BS.

Referring to FIG. 8B, at a time point 831, the BS may receive an SRS. Before the next SRS is received, the SRS buffer may include $F_0 = h_{SRS}(t_0, \{f\}_{febW_1})$ 841 and $F_1 = h_{SRS}(t_0-P, \{f\}_{febW_1})$ 851. $\theta(t_0)$ which is a state vector at the time point 831 is derived from $F_0 = h_{SRS}(t_0, \{f\}_{febW_1})$ 841 and $F_1 = h_{SRS}(t_0-P, \{f\}_{febW_1})$ 851. For example, $\theta(t_0) = [\tau, \Delta\tau, v, \Delta v, \gamma]$. The BS may generate predicted channel information between the time point 831 and the time point 833 on the basis of the state vector acquired at the time point 831. That is, the BS may generate predicted channel information at a time point between intervals from $t_0$ to $t_0+P$ on the basis of $\theta(t_0)=[\tau, \Delta\tau, v, \Delta v, \gamma]$.

At the time point 833, the BS may receive an SRS. That is, the SRS may be received after P from the time point 831. An SRS transmission period may be P. Before the next SRS is received, the SRS buffer may include $F_0=h_{SRS}(t_0+P, \{f\}_{febW_1})$ 843 and $F_1=h_{SRS}(t_0, \{f\}_{febW_1})$ 853. $\theta(t_0+P)$ which is a state vector at the time point 833 is derived from $F_0=h_{SRS}(t_0+P, \{f\}_{febW_1})$ 843 and $F_1=h_{SRS}(t_0, \{f\}_{febW_1})$ 853. For example, $\theta(t_0+P)=[\tau, \Delta\tau, v, \Delta v, \gamma]$. The BS may generate predicted channel information before the next period (for example, $t_0+2P$) from the time point 833 on the basis of the state vector acquired at the time point 833. That is, the BS may generate predicted channel information at a time point between intervals from $t_0+P$ to $t_0+2P$ on the basis of $\theta(t_0+P)=[\tau, \Delta\tau, v, \Delta v, \gamma]$.

For example, at the time point 835, that is, at a time point corresponding to $t_0+P+\Delta t$, the BS may generate predicted channel information on the basis of a state vector $\theta(t_0+P)$. Since $\theta(t_0+P)$ corresponds to an aged channel state vector at the time point corresponding to $t_0+P+\Delta t$, the BS may estimate a predicted channel through channel parameters of the UKF-based state vector and the corresponding system model. At this time, the estimated channel may be expressed as shown in the following equation.

$$\hat{h}_{\theta(t_0+P)}(t_0+P+\Delta t, \{f\}) \qquad \text{Equation 22}$$

Figure 8C:
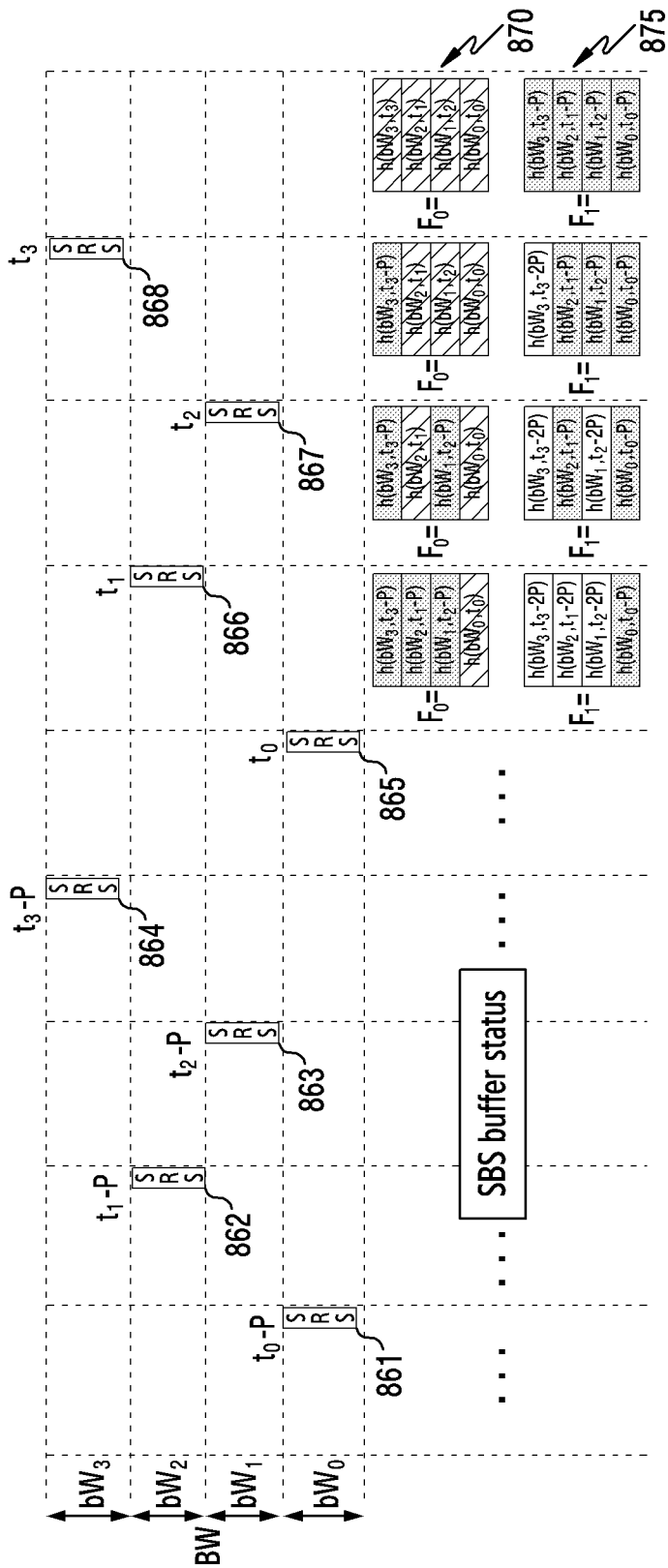
FIG. 8C illustrates an example of SRS buffer management in a wireless communication system according to various embodiments of the disclosure.

FIG. 8C illustrates an example of SRS buffer management in a wireless communication system according to various embodiments of the disclosure. The SRS buffer may include the measurement result for the received SRS.

Referring to FIG. 8C, the BS may receive SRSs. The BS may periodically receive SRSs. At this time, the BS may receive SRSs in various bandwidths (for example, $bW_0$, $bW_1$, $bW_2$, and $bW_3$). For example, the BS may receive an SRS 861 in $(t_0-P, bW_0)$. The BS may receive an SRS 862 in $(t_1-P, bW_2)$. The BS may receive an SRS 863 in $(t_2-P, bW_1)$. The BS may receive an SRS 864 in $(t_3-P, bW_3)$. The BS may receive an SRS 865 in $(t_0, bW_0)$. The BS may receive an SRS 866 in $(t_1, bW_2)$. The BS may receive an SRS 867 in $(t_2, bW_1)$. The BS may receive an SRS 868 in $(t_3, bW_3)$.

The BS may update the SRS buffer sequentially for the received SRSs. The BS may update the SRS buffer and store the same in the memory for respective frequency resources f through which new SRS data arrives. The SRS buffer may include the sequence of SRS channel estimation values $\{B_0, B_1, \ldots\}$. The BS may update channel prediction parameters $\{\theta_0, \theta_1, \ldots\}$ according to the channel prediction model selected using the sequence of SRS channel estimation values. In the case of the update, previous channel prediction parameters are used as inputs. At a time $t(t>t_0)$, the BS may derive a channel in each frequency resource k on the basis of a channel prediction model. In channel prediction, the BS may have at least one of $\{F_0, F_1, \ldots\}$ and $\{\theta_0, \theta_1, \ldots\}$ as an input. The SRS buffer may include the raw sequence of SRS channel estimation values $\{F_0$ 870, $F_1$ 875$\}$. The raw sequence may be data which has never been separately processed from the received SRS estimation result. Each $F_i$ may include an SRS matrix for a plurality of frequency resources $\{f\}$ and i is a time index. For example, $F_i=[F_{(i, w)}]_{(w)}$, where W denotes an SRS bandwidth (BW) and includes a plurality of frequency resource indexes.

In one method, unlike in FIG. 8C, the UE is configured to transmit an SRS in every T millisecond (msec) the same SRS BW, $W_0$. In this case, the same SRS BW corresponds to W, that is, $W_0=W$, and the SRS buffer is updated for all k of W. In another method, as illustrated in FIG. 8C, the UE is configured to transmit an SRS in every T msec in different SRS subbands. For example, the BS includes four SRS subbands, $bW_1$, $bW_2$, $bW_3$, and $bW_4$, and $BW=bW_1 \cup bW_2 \cup bW_3 \cup bW_4$. When the BS receives SRSs of bWs, $s \in \{1,2,3,4\}$, the SRS buffer is updated for all f of bWs and maintained to be the same for f of bW($s \neq$'s). In this case, the SRS buffer for the time index i may include $F_{(i, W\_1)}$, $F_{(i, W\_2)}$, $F_{(i, W\_3)}$, and $F_{(i, W\_4)}$ corresponding to four SRS subbands.

According to the example illustrated in FIG. 8C, a new SRS arrives in every P msec in each of the SRS subbands $W_1$, $W_2$, $W_3$, and $W_4$. The new SRS arrives for each of the SRS subbands $W_1$, $W_2$, $W_3$, and $W_4$ at $t_1=t_0+T$, $t_2=t_0+2T$, $t_2=t_0+3T$, and $t_3=t_0+4T$, where P=4T. When the new SRS arrives at the time $t_0$ for the subband $W_1$, the SRS buffer for the subband $W_1$ is updated to newly arriving SRS channel estimation values. When a bW1 part of $F_0$ (that is, $F_{(0, W\_1)}$) is updated to a new SRS estimation value of an SRS subband, that is, $h(bW1, t_2)$ and a $W_1$ part of $F_1$ is updated, a $bW_1$ part of F(that is, $F_{(1, bW\_1)}$) is updated to a previous SRS estimation value of the SRS subband, that is, $h(bW1, t_2-P)$. The SRS buffer for each subband may be similarly updated when an SRS of the subband newly arrives.

Figure 9A:
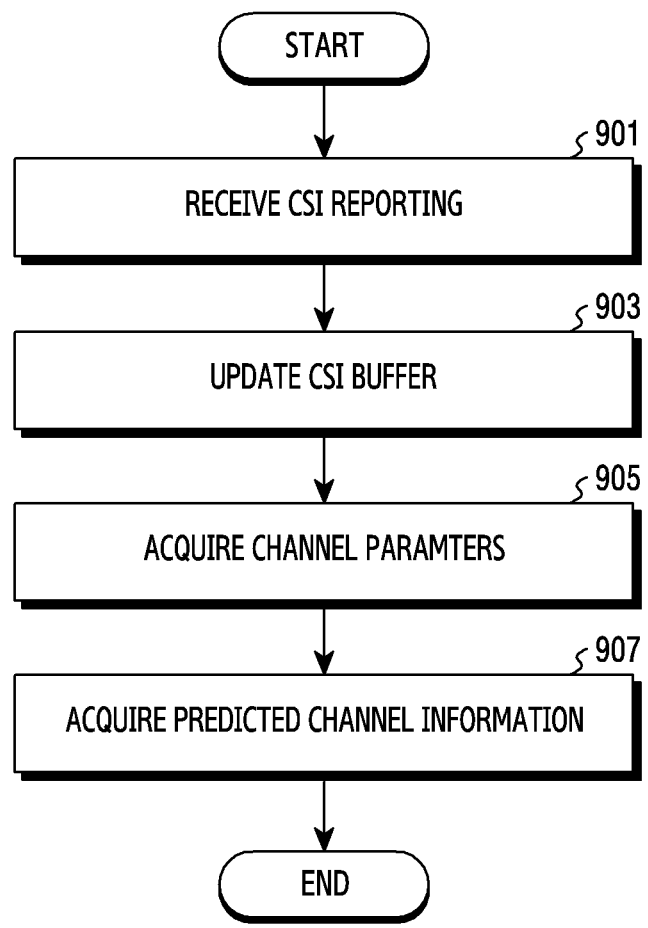
FIG. 9A is a flowchart illustrating the operation of a device for channel estimation using channel state information (CSI) in a wireless communication system according to various embodiments of the disclosure.

FIG. 9A is a flowchart illustrating the operation of a device for channel estimation using channel state information (CSI) in a wireless communication system according to various embodiments of the disclosure. The BS 110 of FIG. 1 is illustrated as a device performing channel estimation.

In operation 901, the BS may receive CSI. The BS may transmit a CRS or a CSI-RS to the UE and the UE may generate CSI on the basis of the CRS or the CSI-RS. The UE may report the generated CSI to the BS. According to an embodiment, the UE may periodically report the CSI. The CSI may include a PMI. For example, the PMI may be a PMI for the configured entire bandwidths, that is, a wideband PMI. Further, for example, the PMI may be a subband PMI. Hereinafter, the PMI is described as a CSI element for a channel vector in the disclosure, but may be used for estimating a channel by other parameters of CSI.

In operation 903, the BS may update a CSI buffer. The CSI buffer may include a PMI buffer. The PMI buffer may include information on the PMI included in the CSI. The BS may update the PMI buffer on the basis of the PMI acquired in operation 901. According to an embodiment, the BS may manage the PMI buffer according to time-frequency resources. For example, the BS may manage the PMI buffer in units of specific frequency domains or time domains. The specific frequency domains may be configured in units of at least one of PRBs, physical resource block groups (PRGs), subbands, bandwidth parts (BWPs), channel bandwidths, and carrier frequencies. Further, the time domains may be configured in units of CSI-RS transmission periods, CSI report periods, TTIs, or periods in which the same frequency domain is repeated.

In operation 905, the BS may acquire channel parameters. The BS may acquire channel parameters on the basis of the CSI buffer (for example, the PMI buffer). The BS may acquire the channel parameters on the basis of the PMI for each time-frequency resource. The channel parameter according to various embodiments may be a parameter included in the state vector $(\theta_k)$ of the UKF. At this time, the parameters included in the state vector may include at least one of channel parameters illustrated in the system model of FIG. 6A. For example, the channel parameters may include at least one of a delay parameter, a Doppler parameter, a change value of the delay parameter, a change value of the Doppler parameter, and an amplitude and phase of a signal. For example, the state vector at the time $t_0$ may be determined as shown in the following equation.

$$\theta(t_0) = [\tau, \Delta\tau, v, \Delta v, \gamma] \quad \text{Equation 23}$$

In an operation 907, the BS may acquire predicted channel information. The predicted channel information may include channel vectors before the next CSI (including the PMI) is received and channel information is updated after the time interval $t_0$ (for example, in the case of a period of T, before $t_0+T$ from $t_0$). The state vector has been updated on the basis of the received PMI, and thus the BS may predict the current channel vector on the basis of the channel parameters of operation 805 before the next CSI (or PMI) is received. The BS may derive predicted channel information (for example, channel vectors and channel parameters) in each time interval between $t_0$ and $t_0+T$, that is, $t_0+1$, $t_0+2$, $t_0+T-1$. For example, the BS may derive channel vectors according to the following equation.

$$\hat{h}_{\theta(t_0)}(t_0+1,\{f\}), \ldots, \hat{h}_{\theta(t_0)}(t_0+T-1,\{f\}) \quad \text{Equation 24}$$

$\widetilde{h}_{\theta_{t_0}}$ denotes a channel vector in a state vector ($\theta_{t_n}$) time index t and a frequency index f.

Figure 9B:
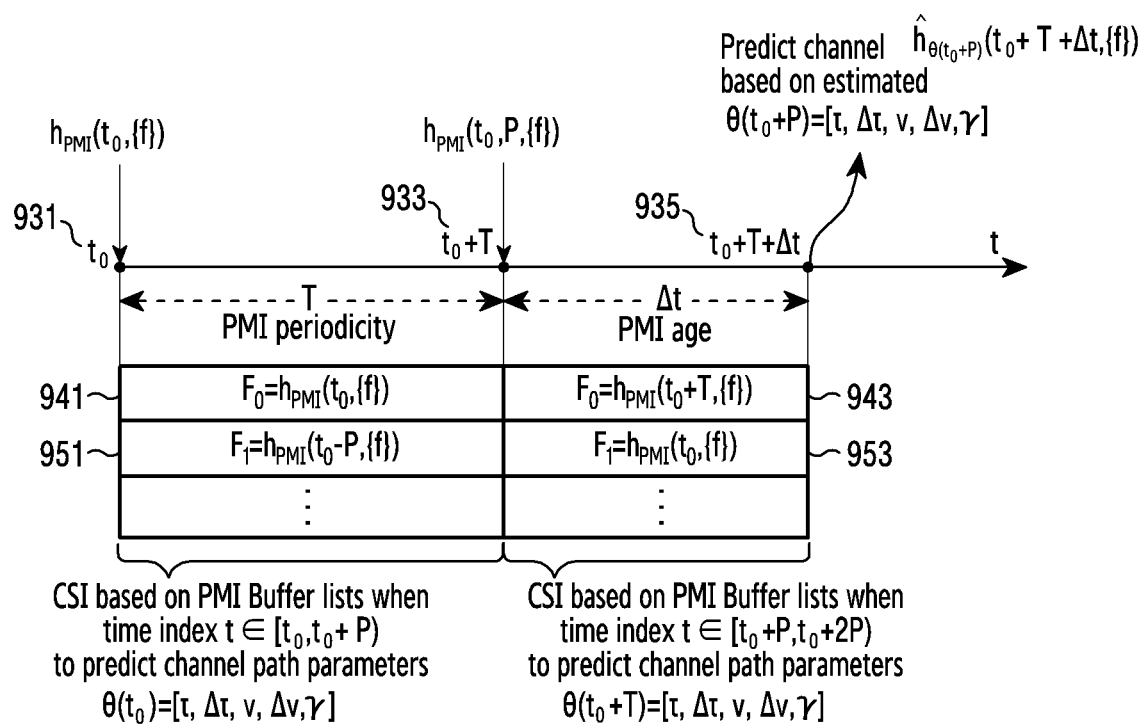
FIG. 9B illustrates an example of channel estimation using CSI in a wireless communication system according to various embodiments of the disclosure.

FIG. 9B illustrates an example of channel estimation using CSI in a wireless communication system according to various embodiments of the disclosure. In FIG. 8B, a process of obtaining a PMI buffer change and predicted channel information by the lapse of time is described. The predicted channel information is channel information after a time point at which channel information is received and refers to information determined on the basis of an estimation value of the BS.

Referring to FIG. 9B, at a time point 931, the BS may receive a PMI. Before the next PMI is received, the PMI buffer may include $F_0=h_{PMI}(t_0,\{f\})$ 941 and $F_1=h_{PMI}(t_0-T,\{f\})$ 951. A state vector $\theta(t_0)$ at the time point 931 is derived from $F_0=h_{PMI}(t_0,\{f\})$ 941 and $F_1=h_{PMI}(t_0-T,\{f\})$ 951. For example, $\theta(t_0)=[\tau, \Delta\tau, v, \Delta v, \gamma]$. The BS may generate predicted channel information between the time point 931 and the time point 931 on the basis of the state vector acquired at the time point 933. That is, the BS may generate predicted channel information at a time point between intervals from to $t_0$ to $t_0+P$ on the basis of $\theta(t_0)=[\tau, \Delta\tau, v, \Delta v, \gamma]$.

At a time point 933, the BS may receive the PMI. That is, the PMI may be received after T from the time point 931. A transmission period of the CSI including the PMI may be T. Before the next PMI is received, the PMI buffer may include $F_0=h_{PMI}(t_0+T,\{f\})$ 943 and $F_1=h_{PMI}(t_0,\{f\})$ 953. $\theta(t_0+T)$ which is a state vector at the time point 933 is derived from $F_0=h_{PMI}(t_0+T,\{f\})$ 943 and $F_1=h_{PMI}(t_0,\{f\})$ 953. For example, $\theta(t_0+T)=[\tau, \Delta\tau, v, \Delta v, \gamma]$. The BS may generate predicted channel information before the next period (for example, $t_0+2T$) from the time point 933 on the basis of the state vector acquired at the time point 933. That is, the BS may generate predicted channel information at a time point between intervals from $t_0+T$ to $t_0+2T$ on the basis of $\theta(t_0+T)=[\tau, \Delta\tau, v, \Delta v, \gamma]$.

For example, at the time point 935, that is, at a time point corresponding to $t_0+T+\Delta t$, the BS may generate predicted channel information on the basis of the state vector $\theta(t_0+T)$. Since $\theta(t_0+T)$ corresponds to an aged channel state vector at the time point corresponding to $t_0+T+\Delta t$, the BS may estimate a predicted channel through channel parameters of the UKF-based state vector and the corresponding system model. At this time, the estimated channel may be expressed as shown in the following equation.

$$\hat{h}_{\theta(t_0+T)}(t_0+T+\Delta t,\{f\}) \quad \text{Equation 25}$$

The BS may schedule the UE in random time/frequency resources and determine a precoder or an MCS for the UE. Particularly, in order to maximize a MU-MIMO gain, it is necessary for the BS supporting massive MIMO necessarily to acquire channel information by the transmitting side for minimizing interference between users and provide an efficient user service. As granularity and accuracy of frequency resources and time resources increase, a scheduling gain improves, and particularly, as granularity and accuracy of time resources increase, it is robust to user mobility and a throughput gain may improve.

For time-frequency resources having no channel estimation (for example, SRS age of FIG. 8B or PMI age of FIG. 9B), the BS may use previously sampled or aged channel estimation values. At this time, when the aged channel estimation is used, scheduling reflecting a channel estimation value may operate well in static UEs having no user mobility but the scheduling performance may deteriorate in UEs having mobility. This it because the old channel estimation value cannot correctly reflect the current channel state in the light of the terminal having high mobility. Accordingly, through UKF-based channel estimation, the disclosure presents a method of predicting channel parameters when reconfiguring a channel for time-frequency resources in which an SRS channel estimation value or a CSI-based channel estimation value is not available. The BS may predict a channel by using SRS channel estimation values previously collected on the basis of a prediction model and CSI reporting reported by the UE. The prediction model may be parameterized. When a new SRS or CSI is received, the BS may update channel prediction parameters. For example, in the case of $t>t_0$, the BS may generate predicted channel information on the basis of at least one of the sequence $\{F_0, F_1\}$ of the SRS channel estimation values in the SRS buffer, channel prediction parameters $\{\theta_0, \theta_1, \ldots\}$, SRS age (non-updating duration), or $\Delta t=t-t_0$, as input, as illustrated in FIGS. 8B and 8C. Further, as illustrated in FIG. 9B, the BS may generate predicted channel information on the basis of at least one of the sequence $\{F_0, F_1\}$ of the channel estimation values in the PMI buffer, channel prediction parameters $\{\theta_0, \theta_1, \ldots\}$, PMI age (non-updating duration), or $\Delta t=t-t_0$, as input. The BS generates a channel estimation value at the time tin each frequency resource f.

Channel estimation using the SRS and estimation using the PMI of the CSI are illustrated as examples with reference to FIGS. 8A to 9B, but the two channel schemes can be combined and used. That is, the BS may adaptively use a TM mode so as to complementarily use the CSI received during a channel estimation process using the SRS or complementarily use the SRS during a channel estimation process using the CSI.

UKF-Based State Information

Figure 10:
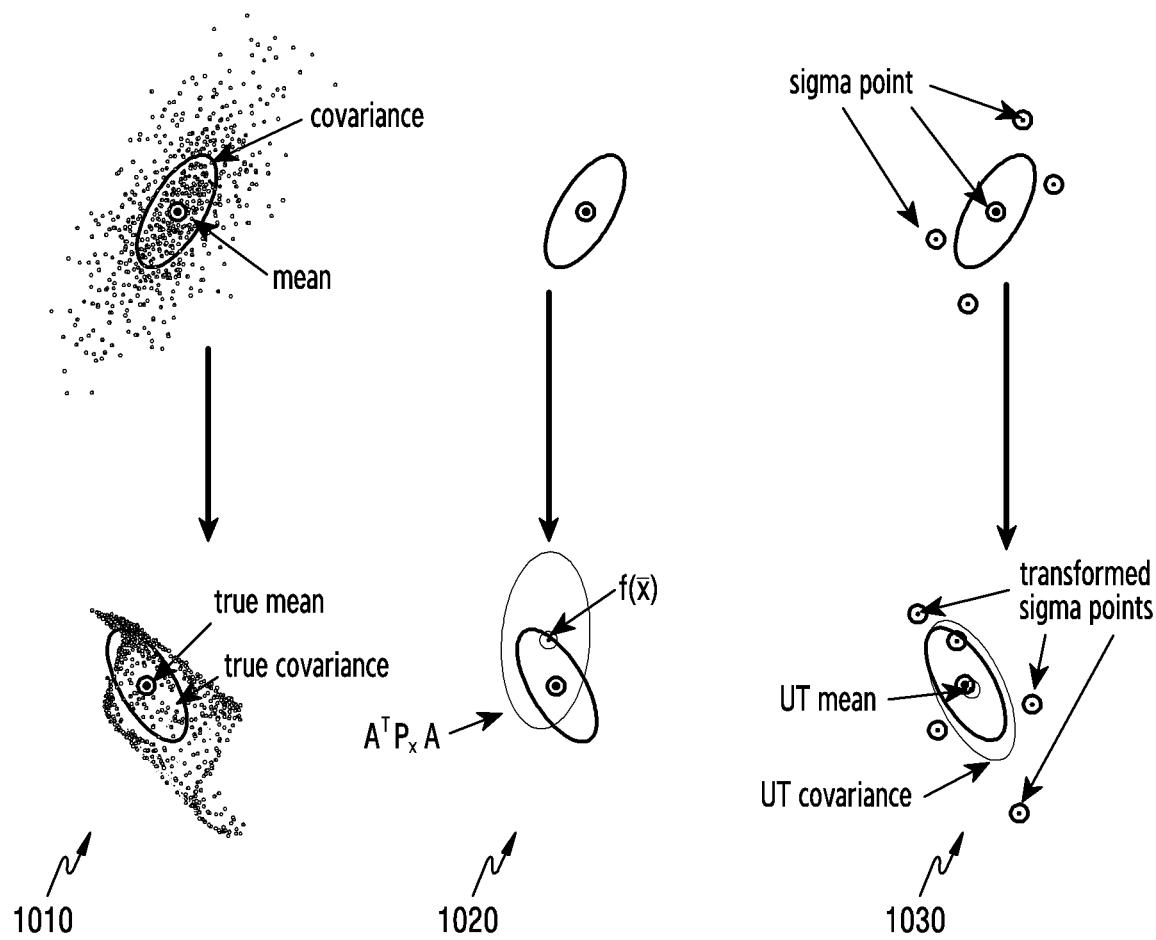
FIG. 10 illustrates the principle of the UKF in a wireless communication system according to various embodiments of the disclosure.

FIG. 10 illustrates the principle of the UKF in a wireless communication system according to various embodiments of the disclosure. Channel parameters used for channel estimation in the disclosure are configured by a state vector acquired on the basis of the UKF.

Referring to FIG. 10, first distribution 1010 indicates sampling for real samples. Second distribution 1020 indicates sampling based on the EKF. Since the Kalman filter is attributed to a linear model, a channel state that significantly fluctuates according to time resources, frequency resources, and spatial resources may not be linear according to movement of the UE. Particularly, the channel vector includes nonlinear elements (for example, exponential elements) such as a phase parameter, a delay parameter, a Doppler parameter, and the like, and thus the conventional Kalman filter has difficulty in smoothly operating. The EKF-based sampling performs linearization approximation through Taylor expansion and thus has a somewhat difference from the sampling result for real samples.

Third distribution 1030 indicates UKF-based sampling. The UKF-based sampling may include an unscented transform (UT) process instead of the linearization approximation. The unscented transform may include a process of deriving sigma points near the mean, a process of determining weights for sigma points, and a process of calculating outputs of sigma points through a nonlinear function. Through the above-described procedures, new Gaussian distribution having $UT_{mean}$ and $UT_{covariance}$ is derived. Since the mean/covariance for the nonlinear function is calculated instead of the linear transform such as Taylor expansion, UKF-based channel estimation may provide the result similar to that of real distribution (for example, the first distribution 1010) in the nonlinear model. The unscented transform may provide improvement of the performance and also derive high-dimensional state parameters in the form of a predetermined state vector to provide low complexity in the nonlinear model.

Figure 11A:
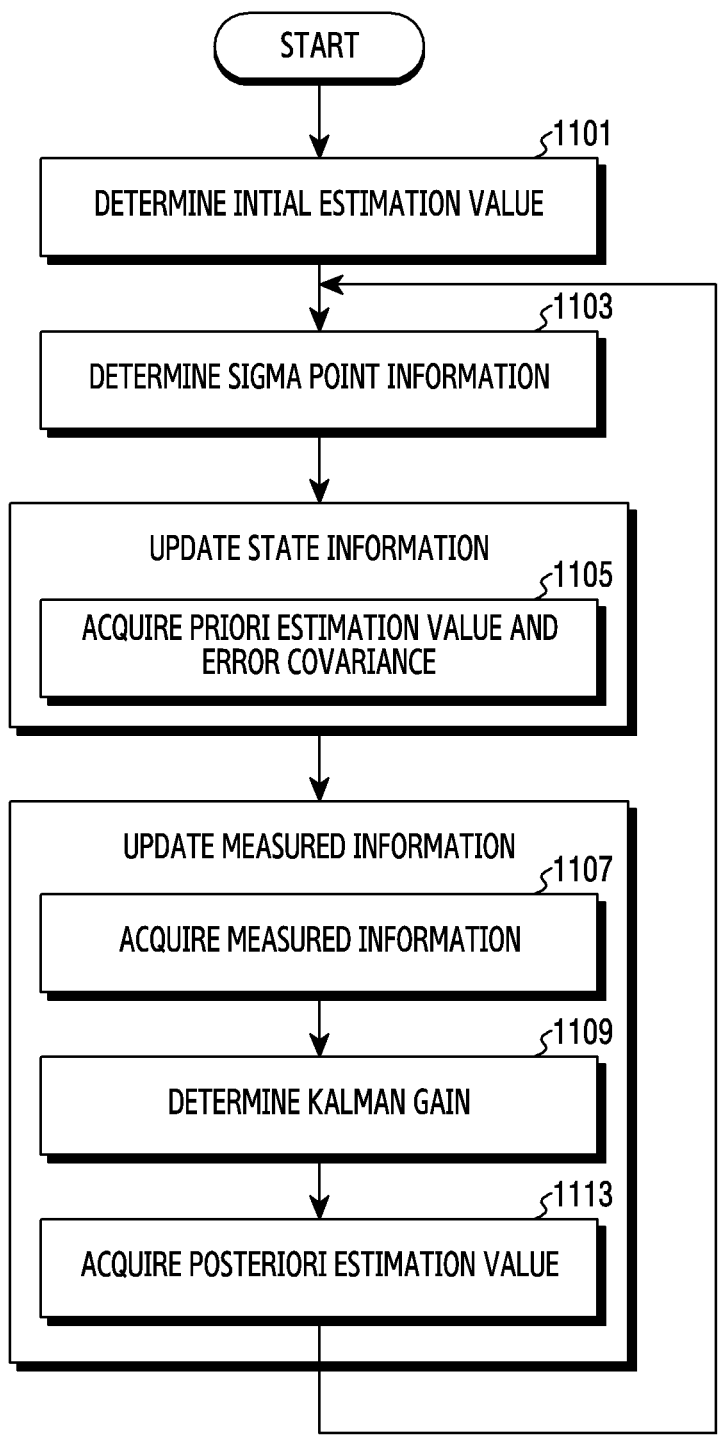
FIG. 11A is a flowchart illustrating the operation of a device for managing UKF-based state information in a wireless communication system according to various embodiments of the disclosure.

FIG. 11A is a flowchart illustrating the operation of a device for managing UKF-based state information in a wireless communication system according to various embodiments of the disclosure. The BS 110 of FIG. 1 is illustrated as a device for managing state information. Procedures in FIG. 11A are procedures of managing state information in operation 703 of FIG. 7, and the operation flow in FIG. 11A may be understood as the operation of the channel estimation device in FIG. 7 or some elements of the channel estimation device.

Referring to FIG. 11A, in operation 1101, the BS may determine an initial estimation value.

The BS may determine an initial average value of state vectors. The BS may determine an initial covariance value of the state vector. For example, the state vector may be $\theta_k = [\tau_k^T, v_k^T, \Delta\tau_k^T, \Delta v_k^T, \alpha_k^T, \phi_k^T]^T$. The covariance may be $P_k^\theta = E[(\theta_k - \hat{\theta}_k)(\theta_k - \hat{\theta}_k)^H]$. The BS may determine $\hat{\theta}_k$ and $P_0^\theta$ (that is, k=0).

In operation 1103, the BS may determine sigma point information. The sigma point information may include information on locations of sigma points in the UKF and information on a weight of each sigma point. The BS may calculate sigma points. Further, the BS may calculate the weight of each sigma point. The number of sigma points is determined on the basis of the size of a dimension of a covariance matrix. For example, the BS may calculate sigma points ($\chi_i$) and weights ($W_i$) in the corresponding sigma points on the basis of the following equation.

$$(\hat{\theta}_{k-1}, P_{k-1}^\theta, \kappa) \rightarrow (\chi_i, W_i) \text{ such that } U_k^T U_k = (n+\kappa) P_{k-1}^\theta \quad \text{Equation 26}$$

$\hat{\theta}_{k-1}$ denotes an average value of previous state vectors, $P_{k-1}^\theta$ denotes a covariance of previous state vectors, n denotes a dimension, and κ is a constant. 2n+1 sigma points are determined, and each weight is determined on the basis of n and κ. According to an embodiment, in order to derive the sigma points and the weights, cholesky factorization may be used.

In operation 1105, the BS may acquire a priori estimation value and an error covariance. The priori estimation value indicates a state expected in a time interval k when a state in a time interval k−1 is assumed. The priori estimation value may be determined on the basis of the following equation.

$$(\hat{\theta}_{k|k-1}, P_{k|k-1}^\theta) = UT(\chi_i, W_i, Q) \text{ with } P_{k|k-1}^\theta = \text{cov}(\theta_k - \hat{\theta}_{k|k-1}) \quad \text{Equation 27}$$

$(\hat{\theta}_{k|k-1}, P_{k|k-1}^\theta)$ denotes new Gaussian distribution. $\hat{\theta}_{k|k-1}$ denotes a predicted state and is acquired through a combination of a state transfer function output $f(\chi_i)$ and the weight($W_i$) in the sigma point($\chi_i$). Operation 1105 is a procedure of estimating state information of the time interval k on the basis of state information in the time interval k−1 and may be referred to as a state update procedure.

In operation 1107, the BS may acquire measurement information. The measurement information may include a measurement result for the SRS received from the UE and may include CSI related to a measurement result for the CSR or the CSI-RS. That is, the BS may acquire measurement information from the SRS buffer or the CSI buffer. The measurement information may be $\gamma_k$.

In operation 1109, the BS may determine a Kalman gain. The Kalman gain is a weight applied to the Kalman filter and may be a gain repeatedly updated to minimize an error from inaccurate measurement information. First, the BS may predict measurement information and a covariance independently from the real measurement information. For example, the BS may estimate the measurement information and the covariance on the basis of the following equation.

$$(\hat{y}_k, P_k^y) = UT(h(\chi_i), W_i, R) \text{ with } P_{k|k-1}^y = \text{cov}(y_k - \hat{y}_{k|k-1}) \quad \text{Equation 28}$$

$(\hat{y}_k, P_k^y)$ denotes Gaussian distribution. $\hat{y}_k$ denotes a predicted measurement state and is acquired through a combination of an update function output $h(\chi_i)$ and the weight($W_i$) in the sigma point($\chi_i$). The corresponding estimation procedure is an estimation procedure before the real measurement information is acquired and may be performed before operation 1107 or after operation 1107. That is, the procedure may be performed independently from the procedure of acquiring the real measurement information.

The BS may calculate the Kalman gain on the basis of the estimated information and the measurement information really acquired in operation 1107. The Kalman gain is a gain determined to minimize an error from inaccurate measurement information, and the BS may calculate the Kalman gain in the time interval k. For example, the BS may calculate the Kalman gain according to the following equation.

$$P_k^{\theta y} = \sum_{i=1}^{2n+1} W_i \{f(\chi_i) - \hat{\theta}_{k|k-1}\}\{h(\chi_i) - y_k\}^T \quad \text{Equation 29}$$

$$K_k = P_k^{\theta y}(P_k^y)^{-1}$$

$K_k$ denotes a Kalman gain in a time interval k.

In operation 1111, the BS may acquire a posteriori estimation value. The BS may acquire the posteriori estimation value on the basis of the Kalman gain, the priori estimation value, and a difference in the measurement information. For example, the BS may calculate the posteriori estimation value according to the following equation.

$$\hat{\theta}_k = \hat{\theta}_{k|k-1} + K_k(y_k - h(\hat{\theta}_{k|k-1})) \quad \text{Equation 30}$$

The posteriori estimation value ($\hat{\theta}_k$) means a state vector in the time interval k. The BS according to various embodiments may perform channel estimation on the basis of channel parameters according to $\hat{\theta}_k$ until next measurement information is updated (for example, until the next CSI is received) the time interval k. In the next time interval (time interval k+1), the BS may perform operation 1103 to operation 1111 again.

Operations 1107 to 1111 are a procedure of correcting state information estimated from the real measurement information and may be referred to as a measurement update procedure. Meanwhile, although FIG. 11A illustrates that the state update procedure and the measurement update procedures are performed in one cycle, embodiments of the disclosure are not limited thereto. The measurement update procedure needs reception of the real channel information, and thus the number of times each procedure is performed may be different. In some embodiments, the measurement update procedure may be performed the smaller number of times than the state update procedure. According to an embodiment, a ratio between the number of state updates and the number of measurement updates may vary depending on a channel condition. For example, when the channel state is significantly fluctuated, it is required to minimize possibility of the error through reflection of real values by means of a continuous measurement information update.

Figure 11B:
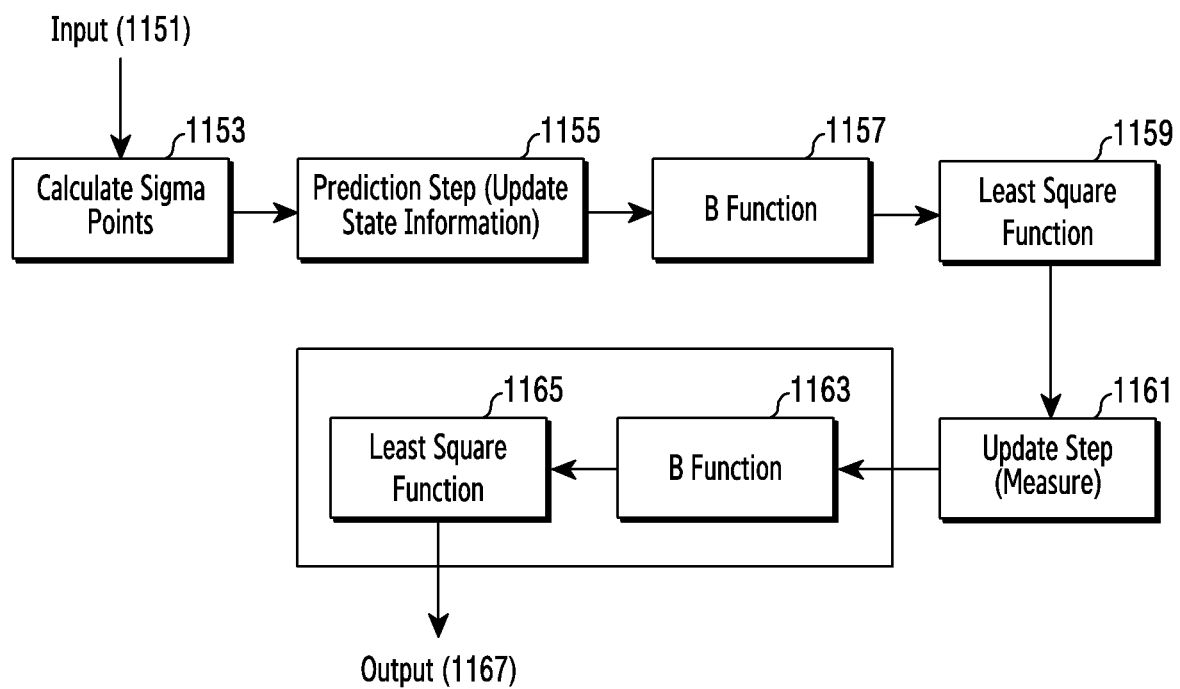
FIG. 11B illustrates the flow of the operation of a device for managing state information combined with a least square method in order to reduce complexity of a UKF-based algorithm in a wireless communication system according to various embodiments of the disclosure.

FIG. 11B is a flowchart illustrating the operation of a device for managing state information combined with a least square method in order to reduce complexity of a UKF-based algorithm in a wireless communication system according to various embodiments of the disclosure.

The BS may estimate time delays and Doppler frequencies for each path twice as many as paths for each user on the basis of the UKF and the EKF. In order to maximize a MU-MIMO gain, a channel value for each antenna should be eventually estimated for channel estimation of massive MIMO. At this time, since the path parameter is common for all antennas for each user, complexity of channel estimation may be reduced. That is, the assumption may be used for designing a channel prediction algorithm having reduced complexity. It is possible to estimate the delay parameter ($\tau$) and the Doppler parameter (v) by using the UKF algorithm, and referring to FIG. 12, a matrix B is a matrix obtained by stacking P Bp vectors. After estimating the common channel matrix B on the basis of UFK through [Equation 12], the BS may desire to acquire a complex weight($\gamma_k$) which is a channel coefficient for each path viewed from a $k^{th}$ antenna. The BS according to various embodiments may perform channel estimation on the basis of a least square method. The BS may acquire a relevant channel coefficient for each antenna (for example, the $k^{th}$ antenna) on the basis of the least square method and estimate a channel on the basis of the acquired channel coefficient.

Referring to FIG. 11B, in operation 1151, the BS may acquire state vector information, covariance information, and channel measurement information as inputs. For example, the state vector information may be expressed as $\theta_n$. For example, $\theta_n$ may be the size of $2P_{max}\times1$. $P_{max}$ may be the number of paths. For example, the covariance information may be expressed as $P_n$. For example, $P_n$ may be the size of $2P_{max}\times2P_{max}$. For example, the channel measurement information may be expressed as $y_k$. At this time, $y_k$ may be the size of $N_{RBperband}N_{SRSband}\times1$. $N_{SRSband}$ may be the number of SRS bands and $N_{RBperband}$ may be the number of RBs for each band. Here, k may indicate an $k^{th}$ antenna.

In operation 1153, the BS may calculate sigma points for the UKF. In operation 1155, the BS may perform a prediction operation. That is, the BS may perform a state information update of the UKF algorithm. The BS may update the state vector.

In operation 1157, the BS may execute a function B. At this time, inputs may be $[\tau]_{1\times P_{max}}$ and $[v]_{1\times P_{max}}$. Outputs may be $B, B_f, B_{tf}$. For example, each parameter of the function B in [Equation 12] may be used.

In operation 1159, the BS may acquire a channel vector from the function B and a reception vector on the basis of the least square function. The least square function is a method of obtaining an estimation value to make a square of an error between the real value and the estimation value minimum. For example, for a channel frequency response ($y_k$) for each antenna, the BS may inversely calculate a vector $\Gamma_k$ which is a channel coefficient for each $k^{th}$ antenna, each channel path on the basis of the following equation. p may be the number of paths and $N_T$ may be the number of transmission antennas.

Input: $[B]_{N_{RBperBand}N_{SRS}\times p}$, $[y]_{N_{RBperBand}N_{SRSband}\times 1}$
Purpose of this block: Find $\Gamma_k^T$ such that $y_k=B\cdot\Gamma_k^T$ $$\Gamma_k^T=B^{-1}\cdot y_k, \dim(\Gamma_k^T)=p\times 1 \qquad \text{Equation 31}$$

※ $B^{-1}$ is common for all k
Output: $\Gamma=[(\Gamma_1^T), (\Gamma_2^T), \ldots, (\Gamma_{N_T}^T)]^T$, $\dim(\Gamma)=N_T\times p$ In operation 1161, the BS may perform an update operation. That is, the BS may update a channel vector on the basis of measured values. According to an embodiment, the BS may further perform operation 1161 to operation 1163. For example, the BS may execute the function B and the least square function. According to another embodiment, unlike in FIG. 11B, the BS may output parameters after operation 1161 and end the operation.

Through the above-described operations, the BS may output a Doppler parameter (for example, $[\tau]_{1\times P_{max}}$), a time delay parameter (for example, $[v]_{1\times P_{max}}$), a channel coefficient(for example, $[\Gamma]_{N_T\times P_{Max}}$), a state vector (for example, $[P_n]_{N_T\times P_{Max}}$), and a covariance error (for example, $[\theta_n]_{2P_{Max}\times 1}$). Although the channel coefficient for each of all the antennas is not estimated through the UKF or the EKF, the BS may more effectively operate the UKF or the EKF in a low dimension through the method.

The channel estimation method more robust to movement of the UE through prediction of a channel based on the UKF algorithm and correction based on the real measurement value has been described with reference to FIGS. 6A to 11B. Recently, a distributed deployment network structure is proposed for function division, and accordingly, a message between a central unit(CU) and a distributed unit(DU) for UKF channel estimation according to the disclosure may be defined. When acquiring a measurement result or a CSI report according to SRS reception, the DU may transfer the same to the CU. Accordingly, messages reporting raw channel information to the CU may be defined. For example, the DU may define report messages including a CSI report, PMIs managed in units of frequencies, or SRS measurement results in units of time-frequency resources. The CU may estimate the current channel state vector according to the UKF algorithm on the basis of acquired channel information. According to an embodiment, the CU may provide the final scheduling result to the DU. The CU may include a scheduler. Further, according to an embodiment, the CU may provide current state information for acquired channel information to the DU. The DU may estimate a channel in real time on the basis of the current state information. The DU may calculate the current channel vector on the basis of a time delay parameter, a Doppler parameter, or a spatial vector according to the current state information before the next channel information is acquired. The DU may include a scheduler. In such a scenario, a control message including at least one parameter included in the state information (for example, state vectors ($\theta_k$) in [Equation 15] to [Equation 17]) may be defined.

Figure 12:
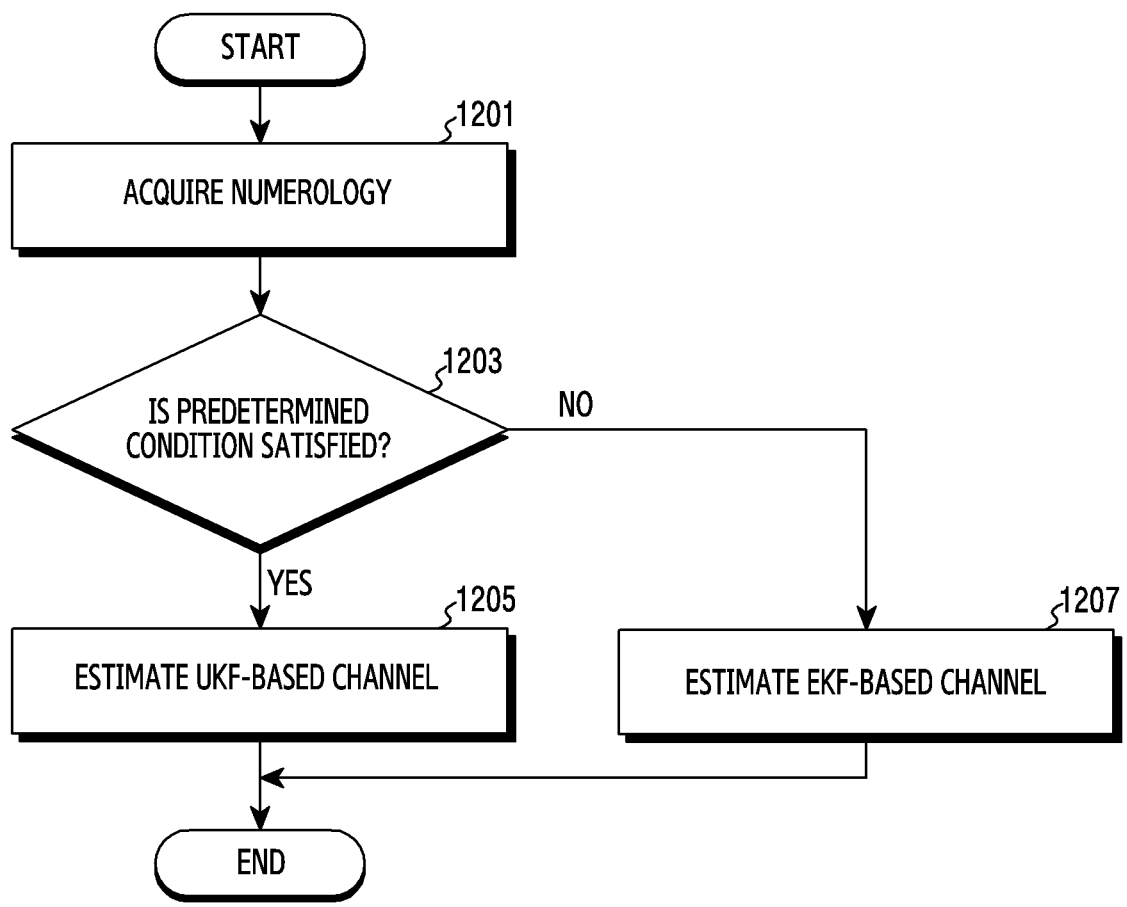
FIG. 12 illustrates the flow of the operation of a device for adaptive channel estimation according to numerology in a wireless communication system according to various embodiments of the disclosure.

FIG. 12 is a flowchart illustrating the operation of the operation of a device for adaptive channel estimation according to numerology in a wireless communication system according to various embodiments of the disclosure. The BS 110 of FIG. 1 is illustrated as a device performing channel estimation.

Referring to FIG. 12, in operation 1201, the BS may acquire numerology information. The numerology information refers to subcarrier spacing and a symbol length in time-frequency resource grids, and may be indicated by μ. For example, in the NR system μ may be configured as follows. The symbol length decreases by increasing subcarrier spacing.

TABLE 1

| μ | $\Delta f = 2^\mu \cdot 15[kHz]$ |
|---|---|
| 0 | 15 |
| 1 | 30 |
| 2 | 60 |
| 3 | 120 |
| 4 | 240 |

In operation 1203, the BS may determine whether a predetermined condition is satisfied. The predetermined condition is a condition to trigger UKF-based channel estimation. The BS may determine whether the predetermined condition is satisfied on the basis of numerology information. The numerology information influences a Doppler effect on a demodulation reference signal (for example, a DM-RS) and selection of a frequency of a channel. For example, when configured μ is larger than or equal to a threshold value, the BS may determine that the predetermined condition is satisfied. Since a channel change per RB relatively increases according to the decreased symbol length and the increased subcarrier spacing, it is more sensitive to movement of the UE. Accordingly, the BS may perform UKF-based channel estimation for robust scheduling. When the predetermined condition is satisfied, the BS may perform operation 1205. When the predetermined condition is not satisfied, the BS may perform operation 1207.

In operation 1205, the BS may perform UKF-based channel estimation. UKF-based channel estimation means defining parameters (that is, channel parameters) included in a channel vector as a state vector and executing an algorithm for estimating a value of the corresponding state vector in a UKF scheme. When it is determined that an error occurs during linearization approximation, for example, when mobility of the UE is high or a change in a channel state is great, channel estimation according to nonlinear modeling is needed, and thus the BS may perform UKF-based channel estimation.

In operation 1207, the BS may perform EKF-based channel estimation. EKF-based channel estimation means defining parameters (that is, channel parameters) included in a channel vector as a state vector and executing an algorithm for estimating a value of the corresponding state vector in a EKF scheme. In the light of a calculation speed, the EKF have an advantage of the UKF, so that the BS may perform EKF-based channel estimation if it is determined that the current channel condition is similar to the linear model.

Although FIG. 12 illustrates that channel estimation is performed according to the EKF scheme when the UKF scheme is not used, the disclosure is not limited thereto. When the predetermined condition is not satisfied, channel estimation may be performed according to a normal KF scheme instead of the EKF or another recursive filter may be used.

In the NR system, numerology may be changed. Subcarrier spacing may be changed by a change in an operation frequency band or a channel condition (a delay parameter, a Doppler parameter, and the like). At this time, although subcarrier spacing is changed, channel estimation according to various embodiments of the disclosure may be performed. The BS may perform UKF-based channel estimation on the basis of changed numerology information. When subcarrier spacing is changed from first subcarrier spacing to second subcarrier spacing, the BS may perform UKF-based channel estimation in consideration of a change in the subcarrier spacing and a change in the symbol length. According to an embodiment, scale of the Doppler parameter and the delay parameter may be changed on the basis of μ. For example, when subcarrier spacing increases from 15 kHz to 30 kHz, the BS may acquire a channel estimation value for one RE when subcarrier spacing is 30 Hz on the basis of a channel estimation value for two Res when subcarrier spacing is 15 kHz. That is, difference due to the change in numerology in the frequency domain may be compensated. In this case, δf of [Equation 3] may be changed. Further, when subcarrier spacing increases from 15 kHz to 30 kHz, the BS may perform channel estimation in consideration of a slot length decrease according to the reduced symbol length. That is, the BS may predict a channel state in units of Δt/2 instead of Δt.

When the BS receives SRSs and performs UKF-based channel estimation for each UE, implementation complexity may increase. Accordingly, a new CSI feedback method by which the UE estimates a time delay and Doppler for each channel path on the basis of the UKF scheme and feeds back channel parameter therefor to the BS is proposed. As an individual UE distributively processes the UKF and reports feedback information to the BS, the BS may obtain a similar effect of UKF-based channel estimation by performing scheduling on the basis of the feedback information. Hereinafter, FIG. 13 illustrates a new PMI feedback method of the UE through a new codebook structure.

Figure 13:
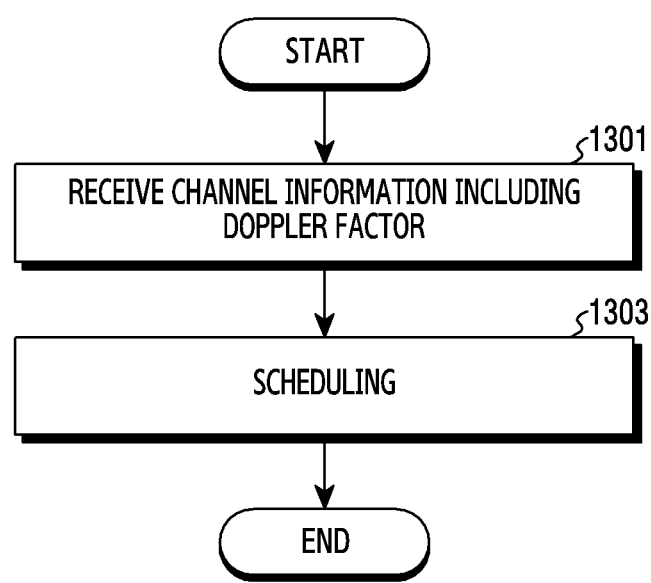
FIG. 13 is a flowchart illustrating the operation of a device for codebook-based channel estimation in a wireless communication system according to various embodiments of the disclosure.

FIG. 13 is a flowchart illustrating the operation of a device for codebook-based channel estimation in a wireless communication system according to various embodiments of the disclosure. The BS 110 of FIG. 1 is illustrated as a device performing channel estimation. The codebook may be a codebook in the form of a linear combination (LC).

Referring to FIG. 13, in operation 1301, the BS may receive CSI including a Doppler factor from the UE. The Doppler factor is a frequency element reflecting a Doppler effect to be robust to mobility of the UE. For example, the UE may feed back an index for the Doppler factor to the BS. The corresponding index is a matrix and may be linearly combined with an element such as amplitude scaling or spatial compression through an LC codebook structure. For example, the index may be configured to indicate $W_4$ in the following equation. In order to enhance MU-MIMO and reduce UCI overhead, a type II codebook structure proposed in Release 16 is described.

$$PM1 = W_1 W_2 W_3 W_4, \quad \text{Equation 32}$$

$$W_1 = \begin{bmatrix} b_0 \ \dots \ b_{L-1} & 0 \\ 0 & b_0 \ \dots \ b_{L-1} \end{bmatrix}$$

$$W_3 = W_f = [f_0 \ \dots \ f_{M-1}]$$

-continued $$W_4 = \text{Diag}\{\exp(jv_0 t) \ldots \exp(jv_{M-1}t)\}$$

$$W_2 = inv(W_1)H_{N,K}inv(W_f^H W_4) = W_1^H H_{N,K} W_f W_4^H$$

In operation 1305, the BS may perform scheduling on the basis of received CSI. The BS may acquire a Doppler factor from the CSI. At this time, the Doppler factor may be information related to the Doppler parameter in [Equation 15] to [Equation 17]. The BS may generate predicted channel information and perform scheduling on the basis thereof before the next Doppler factor is received. By including some of the channel parameters in CSI feedback elements, the load of calculations of the BS may be reduced.

Meanwhile, the BS may perform channel estimation on the basis of Type II codebook-based PMI feedback in NR Release 15 instead of using a separate codebook structure. The Type II codebook-based PMI feedback may include amplitude and phase information. The BS may update state information including amplitude information and phase information. The state information may be configured as shown in [Equation 15]. The BS may update state information according to the UKF-based scheme and predict a channel vector in real time.

According to various embodiments, a method performed by a base station in a wireless communication system may include a process of acquiring channel information for a downlink channel with a UE in a first time interval, a process of acquiring current channel state information from previous state information and the channel information, based on an unscented Kalman filter (UKF), and a process of generating predicted channel information in a second time interval from the current channel state information.

According to an embodiment, the process of acquiring the channel information may include a process of receiving one or more sounding reference signals (SRSs) and a process of generating a measurement result, based on the one or more received SRSs, the one or more SRS may be periodically transmitted according to a period P, and the second time interval may correspond to a time interval before an interval corresponding to the period P after the first time interval.

According to an embodiment, the process of acquiring the channel information may include a process of receiving channel state information (CS) including a precoding matrix indicator (PMI), the CSI may be periodically transmitted according to a period T, and the second time interval may correspond to a time interval before an interval corresponding to the period T after the first time interval.

According to an embodiment, the previous state information may include channel parameters at $t_{k-1}$ before the first time interval, and the current state information includes channel parameters at $t_k$ that is the first time interval.

According to an embodiment, the channel parameters may include at least one of a Doppler parameter, a delay parameter, or a spatial parameter according to an antenna.

According to an embodiment, the process of acquiring the current state information may include a process of determining one or more sigma points for the previous state information, a process of determining weight information for each of the sigma points, a process of generating predicted state information, based on the weight information and the sigma points, and a process of acquiring the current state information, based on the predicted state information and the channel information.

According to an embodiment, the process of generating the predicted channel information may include a process of acquiring a time delay parameter and a Doppler parameter of the current channel state information and a process of generating the predicted channel information, based on the time delay parameter, the Doppler parameter, and resource difference information, and the resource difference information may include a time difference between first time-frequency resources and second time-frequency resources and a frequency difference between the first time-frequency resources and the second time-frequency resources.

According to an embodiment, the predicted channel information may be generated based on an equation of $$h_q(f, t) = \sum_{p=1}^{P} \gamma_{p,q} e^{-j2\pi(f\tau_p - v_p t)},$$

where $h_q(f, t)$ denotes predicted channel information for time-frequency resources (t,f) in a $q^{th}$ antenna, (t,f) corresponds to the time difference and the frequency difference, $\tau_p$ denotes the delay parameter, $v_p$ denotes the Doppler parameter, and $\gamma_{p,q}$ denotes a complex weight for the antenna q.

According to an embodiment, the process of acquiring the current channel information may include a process of acquiring numerology information and a process of acquiring the current channel state information, based on the numerology information, and the numerology information may indicate a subcarrier spacing and a symbol length in a time-frequency resource structure of the downlink channel with the UE.

According to an embodiment, the channel information may include a precoding matrix indicator (PMI) including a Doppler factor, the PMI may correspond to an element of a linear combination (LC) codebook, and the Doppler factor may be acquired by UKF-based channel estimation by the UE.

According to various embodiments, a base station in a wireless communication system may include: at least one transceiver; and at least one processor, wherein the at least one processor is configured to acquire channel information for a downlink channel with a UE in a first time interval, acquire current channel state information from previous state information and the channel information, based on an unscented Kalman filter (UKF), and generate predicted channel information in a second time interval from the current channel state information.

According to an embodiment, the at least one processor may be configured to, in order to acquire the channel information, receive one or more SRSs and generate a measurement result, based on the one or more received SRSs, the one or more SRS may be periodically transmitted according to a period P, and the second time interval may correspond to a time interval before an interval corresponding to the period P after the first time interval.

According to an embodiment, the at least one processor is configured to, in order to acquire the channel information, receive channel state information (CS) including a precoding matrix indicator (PMI), the CSI may be periodically transmitted according to a period T, and the second time interval may correspond to a time interval before an interval corresponding to the period T after the first time interval.

According to an embodiment, the previous state information may include channel parameters at $t_{k-1}$ before the first time interval, and the current state information includes channel parameters at $t_k$ that is the first time interval.

According to an embodiment, the channel parameters may include at least one of a Doppler parameter, a delay parameter, or a spatial parameter according to an antenna.

According to an embodiment, the at least one processor may be configured to, in order to acquire the channel information, determine one or more sigma points for the previous state information, determine weight information for each of the sigma points, generate predicted state information, based on the weight information and the sigma points, and acquire the current state information, based on the predicted state information and the channel information.

According to an embodiment, the at least one processor may be configured to, in order to generate the predicated channel information, acquire a time delay parameter and a Doppler parameter of the current channel state information and generate the predicted channel information, based on the time delay parameter, the Doppler parameter, and resource difference information, and the resource difference information may include a time difference between first time-frequency resources and second time-frequency resources and a frequency difference between the first time-frequency resources and the second time-frequency resources.

According to an embodiment, the predicted channel information may be generated based on an equation of $$h_q(f, t) = \sum_{p=1}^{P} \gamma_{p,q} e^{-j2\pi(f\tau_p - v_p t)},$$

where $h_q(f, t)$ denotes predicted channel information for time-frequency resources (t,f) in a $q^{th}$ antenna, (t,f) corresponds to the time difference and the frequency difference, $\tau_p$ denotes the delay parameter, $v_p$ denotes the Doppler parameter, and $\gamma_{p,q}$ denotes a complex weight for the antenna q.

According to an embodiment, the at least one processor may be configured to, in order to acquire the current channel state information, acquire numerology information and acquire the current channel state information, based on the numerology information, and the numerology information may indicate a subcarrier spacing and a symbol length in a time-frequency resource structure of the downlink channel with the UE.

According to an embodiment, the channel information may include a precoding matrix indicator (PMI) including a Doppler factor, the PMI corresponds to an element of a linear combination (LC) codebook, and the Doppler factor is acquired by UKF-based channel estimation by the UE.

The channel estimation method according to various embodiments of the disclosure aims at more efficiently performing channel prediction, when extracting channel parameters on the basis of the existing channel information (for example, CSI transmitted by the UE or CSI acquired by SRSs), by extracting sigma points through a UKF and continuously predicting/updating a state vector and an error covariance for channel estimation. Therefore, in a channel model nonlinearly configured according to movement of the UE, low-complex and high-performance channel prediction can be achieved through a UKF-based algorithm.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a base station (BS) in a wireless communication system, the method comprising:
 acquiring channel information for a downlink channel with a user equipment (UE) in a first time interval;
 acquiring current channel state information from previous state information and the channel information, based on an unscented Kalman filter (UKF); and
 generating predicted channel information in a second time interval from the current channel state information,
 wherein the generating of the predicted channel information comprises acquiring a time delay parameter and a Doppler parameter of the current channel state information and generating the predicted channel information, based on the time delay parameter, the Doppler parameter, and resource difference information, and the resource difference information includes a time difference between first time-frequency resources and second time-frequency resources and a frequency difference between the first time-frequency resources and the second time-frequency resources.

2. The method of claim 1, wherein the acquiring of the channel information comprises receiving one or more sounding reference signals (SRSs) and generating a measurement result, based on the one or more received SRSs, the one or more SRS are periodically transmitted according to a period P, and the second time interval corresponds to a time interval before an interval corresponding to the period P after the first time interval.

3. The method of claim 1, wherein the acquiring of the channel information comprises receiving channel state information (CSI) including a precoding matrix indicator (PMI), the CSI is periodically transmitted according to a period T, and the second time interval corresponds to a time interval before an interval corresponding to the period T after the first time interval.

4. The method of claim 1, wherein the previous state information includes channel parameters at $t_{k-1}$ before the first time interval, and the current state information includes channel parameters at $t_k$ that is the first time interval.

5. The method of claim 4, wherein the channel parameters include at least one of a Doppler parameter, a delay parameter, or a spatial parameter according to an antenna.

6. The method of claim 4, wherein the acquiring of the current state information comprises:
determining one or more sigma points for the previous state information;
determining weight information for each of the sigma points;
generating predicted state information, based on the weight information and the sigma points; and
acquiring the current state information, based on the predicted state information and the channel information.

7. The method of claim 1, wherein the predicted channel information is generated based on an equation of $$h_q(f, t) = \sum_{p=1}^{P} \gamma_{p,q} e^{-j2\pi(f\tau_p - \nu_p t)},$$

where $h_q$ (f, t) denotes predicted channel information for time-frequency resources (t,f) in a $q^{th}$ antenna, (t,f) corresponds to the time difference and the frequency difference, $\tau_p$ denotes the delay parameter, $\nu_p$ denotes the Doppler parameter, and $\gamma_{p,q}$ denotes a complex weight for the antenna q.

8. The method of claim 1, wherein the acquiring of the current channel state information comprises acquiring numerology information and acquiring the current channel state information, based on the numerology information, and the numerology information indicates a subcarrier spacing and a symbol length in a time-frequency resource structure of the downlink channel with the UE.

9. The method of claim 1, wherein the channel information includes a precoding matrix indicator (PMI) including a Doppler factor, the PMI corresponds to an element of a linear combination (LC) codebook, and the Doppler factor is acquired by UKF-based channel estimation by the UE.

10. A base station (BS) in a wireless communication system, the BS comprising:
at least one transceiver; and
at least one processor,
wherein the at least one processor is configured to:
acquire channel information for a downlink channel with a user equipment(UE) in a first time interval,
acquire current channel state information from previous state information and the channel information, based on an unscented Kalman filter (UKF), and
generate predicted channel information in a second time interval from the current channel state information,
wherein the generating of the predicted channel information comprises acquiring a time delay parameter and a Doppler parameter of the current channel state information and generating the predicted channel information, based on the time delay parameter, the Doppler parameter, and resource difference information, and the resource difference information includes a time difference between first time-frequency resources and second time-frequency resources and a frequency difference between the first time-frequency resources and the second time-frequency resources.

11. The BS of claim 10, wherein the at least one processor is configured to, in order to acquire the channel information, receive one or more SRSs and generate a measurement result, based on the one or more received SRSs, the one or more SRS are periodically transmitted according to a period P, and the second time interval corresponds to a time interval before an interval corresponding to the period P after the first time interval.

12. The BS of claim 10, wherein the at least one processor is configured to, in order to acquire the channel information, receive channel state information (CS) including a precoding matrix indicator (PMI), the CSI is periodically transmitted according to a period T, and the second time interval corresponds to a time interval before an interval corresponding to the period T after the first time interval.

13. The BS of claim 10, wherein the previous state information includes channel parameters at $t_{k-1}$ before the first time interval, and the current state information includes channel parameters at $t_k$ that is the first time interval.

14. The BS of claim 13, wherein the channel parameters include at least one of a Doppler parameter, a delay parameter, or a spatial parameter according to an antenna.

* * * * *